(12) United States Patent
Kuech et al.

(10) Patent No.: US 8,731,207 B2
(45) Date of Patent: May 20, 2014

(54) APPARATUS AND METHOD FOR COMPUTING CONTROL INFORMATION FOR AN ECHO SUPPRESSION FILTER AND APPARATUS AND METHOD FOR COMPUTING A DELAY VALUE

(75) Inventors: Fabian Kuech, Erlangen (DE); Markus Kallinger, Erlangen (DE); Christof Faller, St-Sulpice (CH); Alexis Favrot, Suhr (CH)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 949 days.

(21) Appl. No.: 12/864,240

(22) PCT Filed: Jan. 12, 2009

(86) PCT No.: PCT/EP2009/000123
§ 371 (c)(1),
(2), (4) Date: Nov. 8, 2010

(87) PCT Pub. No.: WO2009/092522
PCT Pub. Date: Jul. 30, 2009

(65) Prior Publication Data
US 2011/0044461 A1    Feb. 24, 2011

Related U.S. Application Data

(60) Provisional application No. 61/023,472, filed on Jan. 25, 2008.

(30) Foreign Application Priority Data

Aug. 22, 2008   (DE) .......................... 10 2008 039 329

(51) Int. Cl.
*H04B 3/20* (2006.01)
*H03G 3/00* (2006.01)

(52) U.S. Cl.
USPC ........ 381/66; 381/56; 381/1; 381/83; 381/95; 381/96; 704/214; 704/233; 704/239; 379/406.01; 379/390.01; 379/406.06; 379/406.07; 379/406.08; 379/406.12

(58) Field of Classification Search
USPC ........ 381/56, 1, 66, 83, 95–96; 704/214, 233, 704/239; 379/406.01, 390.01, 406.06, 379/406.07, 406.08, 406.12
See application file for complete search history.

(56) References Cited

U.S. PATENT DOCUMENTS

| | | | |
|---|---|---|---|
| 5,329,472 A | | 7/1994 | Sugiyama |
| 5,664,052 A | * | 9/1997 | Nishiguchi et al. ........... 704/214 |
| 5,844,994 A | * | 12/1998 | Graumann ...................... 381/56 |
| 5,848,388 A | * | 12/1998 | Power et al. .................. 704/239 |
| 5,930,366 A | | 7/1999 | Jamal et al. |
| 6,556,967 B1 | * | 4/2003 | Nelson et al. ................. 704/233 |
| 6,622,030 B1 | * | 9/2003 | Romesburg et al. .......... 455/570 |
| 6,760,451 B1 | | 7/2004 | Craven et al. |
| 6,961,422 B2 | * | 11/2005 | Boland .................... 379/406.05 |
| 7,742,592 B2 | * | 6/2010 | Faller ....................... 379/406.01 |
| 2002/0054685 A1 | | 5/2002 | Avendano et al. |
| 2004/0240577 A1 | | 12/2004 | Borran et al. |
| 2005/0108004 A1 | * | 5/2005 | Otani et al. ................... 704/205 |

FOREIGN PATENT DOCUMENTS

| | | |
|---|---|---|
| EP | 0 895 397 A2 | 2/1999 |
| JP | 02-291712 A | 12/1990 |
| JP | 05-268105 A | 10/1993 |
| JP | 2000-165300 A | 6/2000 |
| JP | 2002-084212 A | 3/2002 |
| JP | 2006-352239 A | 12/2006 |
| RU | 2 211 531 C2 | 4/2002 |
| RU | 2 233 033 C2 | 6/2003 |
| RU | 2 319 307 C2 | 6/2006 |
| WO | 2004/004297 A2 | 1/2004 |
| WO | 2006/111370 A1 | 10/2006 |

OTHER PUBLICATIONS

Liu et al, Acoustic positioning using multiple microphone arrays, 2005.*
Official Communication issued in corresponding Japanese Patent Application No. 2010-543412, mailed on Nov. 22, 2011.
Official Communication issued in International Patent Application No. PCT/EP2009/000123, mailed on Apr. 1, 2009.

Breining et al., "Acoustic Echo Control", IEEE Signal Processing Magazine, Jul. 1999, pp. 42-69.
Birkett et al., "Limitations of Handsfree Acoustic Echo Cancellers Due to Nonlinear Loudspeaker Distortion and Enclosure Vibration Effects", Proc. IEEE Workshop on Applications of Signal Processing to Audio and Acoustics, Oct. 1995, pp. 1-4.
Schmidt et al., "Acoustic Echo and Noise Control: A Practical Approach", Hoboken, New Jersey, Wiley, 2004, pp. 244-247.
Jeannes et al., "Combined Noise and Echo Reduction in Hands-Free Systems: A Survey", IEEE Trans. on Speech and Audio Proc., Nov. 2001, vol. 9, No. 8, pp. 808-820.
Faller et al., "Suppressing Acoustic Echo in a Spectral Envelope Space", IEEE Trans. on Speech and Audio Proc., Sep. 2005, vol. 13, No. 5, pp. 1048-1062.
Faller et al., "Estimating the Delay and Coloration Effect of the Acoustic Echo Path for Low Complexity Echo Suppression", Proc. Int'l Works. on Acoust. Echo and Noise Control (IWAENC), Sep. 2005.
Etter et al., "Noise Reduction by Noise-Adaptive Spectral Magnitude Expansion", J. Audio Eng. Soc., May 1994, vol. 42, No. 5, pp. 341-349.
Faller et al., "Binaural Cue Coding-Part II: Schemes and Applications", IEEE Transactions on Speech and Audio Processing, Nov. 2003, vol. 11, No. 6, pp. 520-531.
Glasberg et al., "Derivation of Auditory Filter Shapes from Notched-Noise Data", Hearing Research, Feb. 1990, pp. 103-101.
Official Communication issued in corresponding Canadian Patent Application No. 2,713,127, mailed on Oct. 30, 2013.

\* cited by examiner

*Primary Examiner* — Davetta W Goins
*Assistant Examiner* — Kuassi Ganmavo
(74) *Attorney, Agent, or Firm* — Keating & Bennett, LLP

(57) ABSTRACT

An embodiment of an apparatus for computing control information for a suppression filter for filtering a second audio signal to suppress an echo based on a first audio signal includes a computer having a value determiner for determining at least one energy-related value for a band-pass signal of at least two temporally successive data blocks of at least one signal of a group of signals. The computer further includes a mean value determiner for determining at least one mean value of the at least one determined energy-related value for the band-pass signal. The computer further includes a modifier for modifying the at least one energy-related value for the band-pass signal on the basis of the determined mean value for the band-pass signal. The computer further includes a control information computer for computing the control information for the suppression filter on the basis of the at least one modified energy-related value.

32 Claims, 14 Drawing Sheets

APPARATUS AND METHOD FOR COMPUTING CONTROL INFORMATION FOR AN ECHO SUPPRESSION FILTER AND APPARATUS AND METHOD FOR COMPUTING A DELAY VALUE

Embodiments of the present invention relate to apparatuses and methods for computing control information for a suppression filter, apparatuses and methods for suppression filtering, and apparatuses and methods for computing a delay value, as may for example be used in conferencing systems, communications systems and other systems in which acoustic echoes may occur.

BACKGROUND OF THE INVENTION

Acoustic echoes develop, for example, when tones, sounds and noises from a loudspeaker are picked up by a microphone in the same room or in the same acoustic environment. In telecommunication systems, these are transmitted back, as acoustic feedback signals, to the subscriber at the far or other end, who notices them as a delayed version of his own speech. Echo signals here represent a distracting disturbance and may even prevent interactive, bi-directional full-duplex communication. Furthermore, acoustic echoes may also lead to howling effects and other instabilities of the acoustic feedback loop.

Here, the microphone signal picked up by the microphone has differences as compared with the loudspeaker signal supplied to the corresponding loudspeaker, which result from the acoustic environment in which the microphone and the loudspeaker are arranged, on the one hand, and from noise sources originating from the most diverse physical sources, on the other hand. Apart from noise sources of the acoustic environment, the loudspeaker itself, associated circuits, the microphone and other circuits associated therewith, to mention only a few of the potential sources, thus may couple noise into the microphone signal.

The presence of stationary or quasi-stationary noise and noises in the microphone signal here may significantly affect the achievable audio quality of the system.

WO 2006/111370 A1 relates to a method and an apparatus for the removal of an echo in a multi-channel audio signal. Acoustic echo control and noise suppression is an important part of every hands-free telecommunications system, such as telephone, audio or video conferencing systems. Bandwidth limitations and restrictions with respect to the computation complexity also are to be taken into account here. The method of processing multi-channel audio loudspeaker signals and at least one microphone signal described in the document here includes the steps of transforming the input microphone signal into input microphone short-time spectra, computation of a combined loudspeaker signal short-time spectrum from the loudspeaker signals, computation of a combined microphone signal short-time spectrum from the input microphone signal, an estimation of a magnitude spectrum or a power spectrum of the echo in the combined microphone signal short-time spectrum, computation of a gain filter for magnitude modification of the input microphone short-time spectrum, application of the gain filter to at least one input microphone spectrum, and conversion of the filtered input microphone spectrum into the time domain.

SUMMARY

According to an embodiment, an apparatus for computing control information for a suppression filter for filtering a first audio signal to suppress an echo based on a second audio signal may have: a computer including a value determiner for determining at least one energy-related value for a band-pass signal of at least two temporally successive data blocks of at least one signal of a group of signals, the group of signals including the first audio signal, the second audio signal and a signal derived from the first audio signal or the second audio signal; wherein the computer further includes a mean value determination means for determining at least one mean value of the at least one determined energy-related value for the band-pass signal; wherein the computer further includes a modification means for modifying the at least one energy-related value for the band-pass signal on the basis of the determined mean value for the band-pass signal; wherein the computer further includes a control information computation means for computing the control information for the suppression filter on the basis of the at least one modified energy-related value for the band-pass signal; and wherein the value determiner is formed so that the energy-related value is proportional to a power of a value of the band-pass signal with a positive, integer exponent, or wherein the value determination means is formed so that the energy-related value is proportional to a power of a magnitude of the value of the band-pass signal with a positive real number as exponent of the power.

According to another embodiment, a suppression filter for filtering a second audio signal to suppress an echo based on a first audio signal may have: a computer including a value determiner for determining at least one energy-related value for a band-pass signal of at least two temporally successive data blocks of at least one signal of a group of signals, the group of signals including the first audio signal, the second audio signal and a signal derived from the first audio signal or the second audio signal; wherein the computer further includes a mean value determiner for determining at least one mean value of the at least one determined energy-related value for the band-pass signal; wherein the computer further includes a modifier for modifying the at least one energy-related value for the band-pass signal on the basis of the determined mean value for the band-pass signal; wherein the value determiner is formed so that the energy-related value is proportional to a power of a value of the band-pass signal with a positive, integer exponent, or wherein the value determiner is formed so that the energy-related value is proportional to a power of a magnitude of the value of the band-pass signal with a positive real number as exponent of the power; and wherein the computer further includes an acoustic suppression filter for filtering the second audio signal on the basis of control information, wherein the control information at least is based on the at least one modified energy-related value for the band-pass signal.

According to another embodiment, a method of computing control information of a suppression filter for filtering a second audio signal to suppress an echo based on a first audio signal may have the steps of: determining at least one energy-related value for a band-pass signal of at least two temporally successive data blocks of at least one signal of a group of signals, the group of signals including the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power; determining at least one mean value of the at least one determined energy-related value for the band-pass signal; modifying the at least one energy-related value for the band-pass signal on the basis of the determined mean value for the band-pass signal; and computing the control information for the suppression filter on the basis of the at least one modified energy-related value for the band-pass signal.

According to another embodiment, a method of suppression filtering of a second audio signal to suppress an echo based on a first audio signal may have the steps of: determining at least one energy-related value for a band-pass signal of at least two temporally successive data blocks of at least one signal of a group of signals, the group of signals including the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power; determining at least one mean value of the at least one determined energy-related value for the band-pass signal; modifying the at least one energy-related value for the band-pass signal on the basis of the determined mean value for the band-pass signal; and filtering the second audio signal on the basis of control information, wherein the control information at least is based on the at least one modified energy-related value for the band-pass signal.

According to another embodiment, an apparatus for computing a delay value for a delayer for delaying a first signal with respect to a second signal may have: a computer including a value determiner for determining at least one energy-related value for a band-pass signal of the first signal and of the second signal of at least two temporally successive data blocks of the first and second signals, wherein the value determiner is formed so that the energy-related value is proportional to a power of a value of the band-pass signal with a positive, integer exponent, or wherein the value determiner is formed so that the energy-related value is proportional to a power of a magnitude of the value of the band-pass signal with a positive real number as exponent of the power; wherein the computer further includes a mean value determiner for determining at least one mean value of the at least one determined energy-related value for the band-pass signal for the first signal and for the second signal; wherein the computer further includes a modifier for modifying the at least one energy-related value for the band-pass signal of the first and the band-pass signal of the second signal on the basis of the determined mean value for the band-pass signal of the first and seconds signals; and wherein the computer further includes a delay value computer formed to compute the delay value on the basis of the modified energy-related values of the first and second signals.

According to another embodiment, a method of computing a delay value for a delayer for delaying a first signal with respect to a second signal may have the steps of: determining at least one energy-related value for a band-pass signal of the first signal and of the second signal of at least two temporally successive data blocks, wherein the energy-related value is proportional to a power of a value of the band-pass signal with a positive, integer exponent, or wherein the energy-related value is proportional to a power of a magnitude of the value of the band-pass signal with a positive real number as exponent of the power; determining at least one mean value of the at least one determined energy-related value for the band-pass signal of the first signal and of the second signal; modifying the at least one energy-related value for the band-pass signal of the first signal and of the second signal on the basis of the determined mean value for the band-pass signal of the first and second signals; and computing the delay value on the basis of the modified energy-related values of the first and second signals.

Another embodiment may have a program with a program code for performing the method of computing control information of a suppression filter for filtering a second audio signal to suppress an echo based on a first audio signal, said method having the steps of: determining at least one energy-related value for a band-pass signal of at least two temporally successive data blocks of at least one signal of a group of signals, the group of signals including the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power; determining at least one mean value of the at least one determined energy-related value for the band-pass signal; modifying the at least one energy-related value for the band-pass signal on the basis of the determined mean value for the band-pass signal; and computing the control information for the suppression filter on the basis of the at least one modified energy-related value for the band-pass signal, when the program is executed on a processor.

Another embodiment may have a program with a program code for performing the method of suppression filtering of a second audio signal to suppress an echo based on a first audio signal, said method having the steps of: determining at least one energy-related value for a band-pass signal of at least two temporally successive data blocks of at least one signal of a group of signals, the group of signals including the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power; determining at least one mean value of the at least one determined energy-related value for the band-pass signal; modifying the at least one energy-related value for the band-pass signal on the basis of the determined mean value for the band-pass signal; and filtering the second audio signal on the basis of control information, wherein the control information at least is based on the at least one modified energy-related value for the band-pass signal, when the program is executed on a processor.

Another embodiment may have a program with a program code for performing the method of computing a delay value for a delayer for delaying a first signal with respect to a second signal, said method having the steps of: determining at least one energy-related value for a band-pass signal of the first signal and of the second signal of at least two temporally successive data blocks, wherein the energy-related value is proportional to a power of a value of the band-pass signal with a positive, integer exponent, or wherein the energy-related value is proportional to a power of a magnitude of the value of the band-pass signal with a positive real number as exponent of the power; determining at least one mean value of the at least one determined energy-related value for the band-pass signal of the first signal and of the second signal; modifying the at least one energy-related value for the band-pass signal of the first signal and of the second signal on the basis of the determined mean value for the band-pass signal of the first and second signals; and computing the delay value on the basis of the modified energy-related values of the first and second signals, when the program is executed on a processor.

In other signal processing circuits, noise also has a negative influence on the performance of corresponding components, be it analog or digital, electrical or optical signals, which are processed with the signal processing circuit. In particular, signal processing circuits acquiring information from the signals concerned, on the one hand, and then influencing the original signals on the basis of this acquired information, on the other hand, are concerned here.

Examples of such a signal processing circuit, for example, are delay circuits, in which a delay value is derived from a corresponding comparison of two signals. The presence of noise proportions in one or more of the signals concerned may here significantly reduce the performance of the signal processing circuit concerned. Hence, for example, within the scope of a delay circuit, corresponding adaptation of a delay value to the waveform of another signal may be influenced negatively by the noise with respect to its quality and also its adaptation speed.

An embodiment of an apparatus for computing control information for a suppression filter for filtering a second audio signal to suppress an echo which is based on a first audio signal here comprises a computation means. The computation means itself includes a value determination means for determining at least one energy-related value for a band-pass signal of at least two temporally successive data blocks of at least one signal of a group of signals. The group of signals here includes the first audio signal, the second audio signal, and a signal derived from the first or the second audio signal. The computation means further includes a mean value determination means for determining at least one mean value of the at least one determined energy-related value for the band-pass signal. The computation means further includes a modification means for modifying the at least one energy-related value for the band-pass signal on the basis of the determined mean-value for the band-pass signal. The computation means further includes a control information computation means for computing the control information for the suppression filter on the basis of the at least one modified energy-related value for the band-pass signal.

An embodiment of the present invention in form of a suppression filter for filtering a second audio signal to suppress an echo which is based on the first audio signal includes a computation means itself comprising a value determination means for determining at least one energy-related value for a band-pass signal of at least two temporally successive data blocks of at least one signal of a group of signals. The group of signals includes the first audio signal, the second audio signal, and a signal derived from the first or the second audio signal. The computation means further includes a mean value determination means for determining at least one mean value of the at least one determined energy-related value for the band-pass signal. The computation means further includes a modification means for modifying the at least one energy-related value for the band-pass signal on the basis of the determined mean value for the band-pass signal. Moreover, the computation means further includes an acoustic suppression filter means for filtering the microphone signal on the basis of control information, which is based at least on the at least one modified energy-related value for the band-pass signal.

An embodiment of the present invention in form of an apparatus for computing a delay value for a delay means for delaying a first signal with respect to a second signal includes a computation means itself comprising a value determination means for determining at least one energy-related value for a band-pass signal of the first signal and of the second signal of at least two temporally successive data blocks of the first and second signals. The computation means further includes a mean value determination means for determining at least one mean value of the at least one determined energy-related value for the band-pass signal for the first signal and for the second signal. It further includes a modification means for modifying the at least one energy-related value for the band-pass signal of the first and the band-pass signal of the second signal on the basis of the determined mean value for the band-pass signal of the first and second signals. Moreover, the computation means further includes a delay value computation means formed to compute the delay values on the basis of the modified energy-related value of the first and second signals.

Embodiments of the present invention are based on the finding that an improvement in the audio quality with respect to noise sources in a system for echo suppression can be achieved by modifying at least one energy-related value for a band-pass signal with respect to a mean value, before determining control information for the suppression filter and/or the suppression filtering on the basis of the at least one modified energy-related value. Not least because of the averaging and the modification of an energy-related value for a band-pass signal is such a consideration of noise contributions possible, which comprise a statistic mean value of zero in the time domain with respect to the respective momentary values (elongation values), but a mean value different from zero with respect to an energy-related value for a band-pass signal.

By way of the averaging and the ensuing modification of the energy-related value on the basis of the accompanying mean value, separation of stationary spurious signals from those of the actual useful signal is possible prior to the computation of the control information for the suppression filter and/or prior to the actual suppression filtering. Hereby, in some embodiments of the present invention, not least, focusing of the suppression filter and/or the accompanying control information to the actual useful signal is made possible as compared with existing noise components.

In embodiments of the present invention, the energy-related value may here be proportional to a power of a real value with a positive, integer exponent of the power. Likewise, the energy-related value may be proportional to a power of a magnitude (absolute value) with a positive real number as exponent. Thus, in embodiments of the present invention, the energy-related value may be an energy value (square of a magnitude) or a value proportional to an energy value. The first audio signal may here be a loudspeaker signal, and the second audio signal a microphone signal.

In embodiments of the present invention, the value computation means thus may also be formed to determine a plurality of energy-related values for the same data block, but for different band-pass signals with different characteristic frequencies. Here, —generally speaking—band-pass signals are spectral, frequency-close or frequency-related signals, with which at least one characteristic frequency is associated. These characteristic frequencies may, for example, be a center frequency, an initial frequency, a final frequency or another typical frequency. Thus, examples of band-pass signals represent spectral information of a Fourier analysis filter bank, subband or partial band signals, signals from a limited frequency range or also QMF (quadrature mirror filter) signals.

In embodiments of the present invention, a corresponding energy-related value for the associated band-pass signal, an associated time-averaged mean value and a corresponding number of modified energy-related values considering the respective mean values, which then are used in the computation of the control information for the acoustic suppression filter or directly for the acoustic suppression filtering, thus may be computed each not only for an individual band-pass signal, but for a plurality of corresponding band-pass signals or also for all band-pass signals.

In embodiments of the present invention, the mean value computation may be performed on the basis of a sliding average. Here, depending on the concrete implementation of embodiments, the sliding average or the averaging may be based only on data blocks lying before the current data block in time, apart from the current data block. Hereby, real-time averaging may be implemented, for example.

In further embodiments of the present invention, the modification may be performed on the basis of a subtraction of the mean value from the associated energy-related value. Embodiments of the present invention may also comprise a further filter element or also a delay means, wherein the delay means is formed to delay a signal, a waveform or a time sequence of values, such as a time sequence of the energy-related values, by a delay value. The delay value itself may here be determined on the basis of the modified energy-related values, the unmodified energy-related values or other values.

Here, embodiments of the present invention are also based on the finding that improvement in the computation of the delay value for a delay means may be achieved by determining energy-related values for at least one band-pass signal of the first signal and of the second signal, supplying same to averaging, and modifying same correspondingly on the basis of the determined mean values. Hereby, in a frequency range underlying the band-pass signal concerned or the characteristic frequency underlying the band-pass signal, a noise proportion or a stationary signal proportion showing in the energy-related value as a zero-point-shifting influence may be eliminated. Due to the execution of the respective modification on the basis of an energy-related value and with respect to a band-pass signal, a disturbance basically disappearing in the temporal average in form of a noise signal with respect to the corresponding frequency may be eliminated.

With respect to the computation of the delay value, it may be possible to determine a delay value, with the aid of which, for example, adaptation of the waveforms of the first and second signals can be achieved, more quickly, more reliably, or more quickly and more reliably by implementing an embodiment of the present invention.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Before explaining various embodiments of the present invention in detail in connection with FIGS. 2 to 14, the basic problem of echo removal will be explained at first in greater detail in connection with FIG. 1.

For example, acoustic echoes arise whenever tones, sounds or noises from a loudspeaker are picked up by a microphone in the same room or the same acoustic environment. In telecommunication systems, this is transmitted back as an acoustic feedback signal to the far-end subscriber, who notices the echo in form of a delayed version of his own speech. Echo signals represent a very distracting disturbance in such a context and may even lead to the fact that interactive, bi-directional full-duplex communication is inhibited. Moreover, acoustic echoes can result in howling effects and other instabilities of the acoustic feedback loop.

In full-duplex hands-free telecommunication systems, echo control therefore often is advisable to suppress, attenuate or remove the coupling between the loudspeaker and the microphone. FIG. 1 illustrates this acoustic echo problem.

Figure 1:
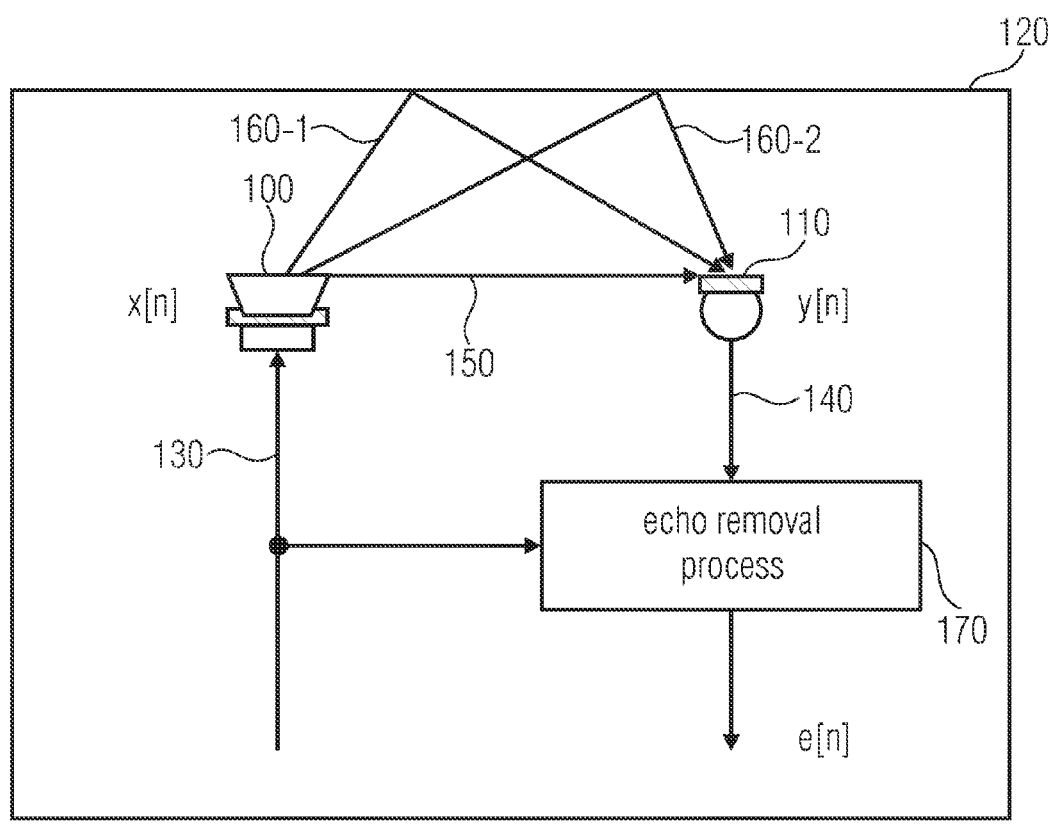
FIG. 1 shows a schematic drawing for illustrating the basic problem of echo removal.

FIG. 1 shows an arrangement of a loudspeaker 100 and a microphone 110 in an acoustic environment 120, which may for example be a room. Here, a loudspeaker signal 130, which is also referred to as x[n] in FIG. 1, is provided to the loudspeaker 100 converting it into acoustic sound waves. The index n here refers to a time index of a discrete course of the loudspeaker signal x[n]. The index n here is an integer.

The microphone 110 picks up the sound waves incident thereon and converts same into a microphone signal 140, which is also referred to as y[n] in FIG. 1. Here, the microphone 110 also picks up, in particular, the acoustic waves, originating from the loudspeaker 100, of the loudspeaker signal x[n], which reaches the microphone 110 from the loudspeaker 100 via various ways. Apart from a direct transmission path 150, also two indirect transmission paths 160-1 and 160-2, in which the sound waves of the loudspeaker 100 are reflected at the acoustic environment 120 and thus reach the microphone 110 only indirectly, are drawn schematically and exemplarily in FIG. 1. The transmission parts 160 thus also are referred to as indirect paths.

Thus, if the loudspeaker signal x[n] made available at the loudspeaker 100 is the speech signal of a far-end telecommunication system subscriber, which is a so-called far-end signal, this is also picked up by the microphone 110. In other words, the far-end signal, upon emission by the loudspeaker 100, travels to the microphone 110 via direct and indirect or reflected paths or transmission paths 150, 160. Hence, the microphone 110 does not only pick up the local speech of the proximate end of the telecommunication system, but also the echo, which is then fed back to the far-end user.

In order to get this problem under control, telecommunication systems often comprise an echo cancellation process circuit or an echo suppression process circuit, also referred to as echo removal process circuit or echo removal process unit 170 in summary in the following, to which both the microphone signal y[n] and the loudspeaker signal x[n] are supplied, as this is also shown in FIG. 1. The echo removal process circuit 170 then outputs a signal e[n] that is echo-removed or partially echo-removed or partially echo-canceled.

FIG. 1 illustrates such a basic construction of an acoustic echo removal problem. The loudspeaker signal x is fed back into the microphone signal y. An echo removal process removes this echo, while local speech, which is generated at this end of a communication system, ideally is allowed to pass.

A conventional approach of dealing with these echoes is to place an acoustic echo canceller (AEC) in parallel to the propagation paths 150, 160 of the echo signal, as also described in reference [1]. In the acoustic echo remover, a digital replica of the echo signal is estimated, which is then subtracted from the measured microphone signal. Standard approaches for the cancellation of the acoustic echo rely on the assumption that the echo path (overall system of the transmission paths 150, 160) can be modeled by a linear FIR (finite impulse response) filter, so that the acoustic echo cancellation is implemented correspondingly, as this is also described in [1]. FIR filters are also referred to as filters with a finite length of the impulse response.

Here, the echo path is given by a multiplicity of parameters, including the characteristics of the loudspeaker 100, those of the microphone 110, as well as those of the acoustic environment 120, as well as properties and features of further objects. For example, temperature variations and temperature gradients of the air may count among these, which are caused by insulation or other heat sources, to name only a few possible sources of deviations.

Since the echo path thus is unknown and also is variable during the operating time, it is advisable to realize the linear filter of the acoustic echo cancellation adaptively. So as to model typical echo paths, thus often FIR filters of lengths up to some hundreds of milliseconds are implemented, which implies high computational complexity. The number of the filter coefficients implemented in the filter here is referred to as the length of an FIR filter, i.e. a filter with a finite impulse response. Here and in other corresponding parameters, if a corresponding number, which actually represents a dimensionless quantity, or a corresponding value is indicated in seconds, milliseconds or another time unit, it relates to the utilized sampling rate (sampling frequency) of the digital signal processing or the correspondingly utilized analog/digital converters and digital/analog converters.

In practice, however, the echo attenuation thus achievable for these conventional approaches is not high enough, which is due to long reverberation times of the echo (echo tail effects), nonlinear echo components and convergence problems. The aforesaid echo tail effects are often caused by undermodeling of the echo path, while the nonlinear echo components are caused by vibration effects or by nonlinear behavior of low-cost or cheap audio hardware components. The convergence problems mentioned, for example, occur in the case of highly time-varying echo paths. Details in this context are set forth in reference [2].

For this reason, it may be useful to combine acoustic echo cancellers with a nonlinear post-processor to remove residual echoes the echo canceller could not eliminate. More details in this respect are to be found in reference [3]. Commonly, the suppression of the residual echoes is performed in frequency-selective manner, as this is set forth in reference [4]. Indeed, almost all acoustic echo cancellers use such post-processors, since they too often fail to sufficiently reduce the echo so that it becomes inaudible.

Recently, a number of acoustic echo suppressors operating in the sub-band range have been proposed, with similarities to the above-mentioned nonlinear post-processors, but without a need for an acoustic echo canceller and without a need for estimating an impulse response of the echo path, as this is set forth in references [5] and [6]. These systems are said to have low computational complexity and to be robust, while achieving a high degree of duplexity.

The echo suppression scheme proposed in reference [6] applies a short-time Fourier transform (STFT) to compute spectra from the loudspeaker and the microphone signals. A delay or a delay value d between the results of the loudspeaker signals transformed by means of STFT is chosen so that most of the echo impulse response is taken into account. Then, a real-valued echo estimation filter mimicking the effect of part of the echo path is estimated. So as to obtain an estimation of the echo magnitude spectrum, the estimated delay value and the echo estimation filter are applied to the loudspeaker signal spectrum. Using the estimation of the echo magnitude spectrum, a real-valued echo suppression filter is computed and applied to the microphone signal spectrum to suppress the echo.

However, the weakness of the above-described acoustic echo suppression (AES) systems is that they do not handle stationary noise in the microphone signal in satisfactory way. As the subsequent explanations also will show, stationary noise results in a contribution (bias) in the echo estimation, which degrades the performance of such systems if the signal-to-noise ratios of the signals concerned are not very high. Depending on the implementation or model, this contribution is also referred to as deviation from an expected estimate, zero-point shift or systematic estimate deviation.

Figure 2:
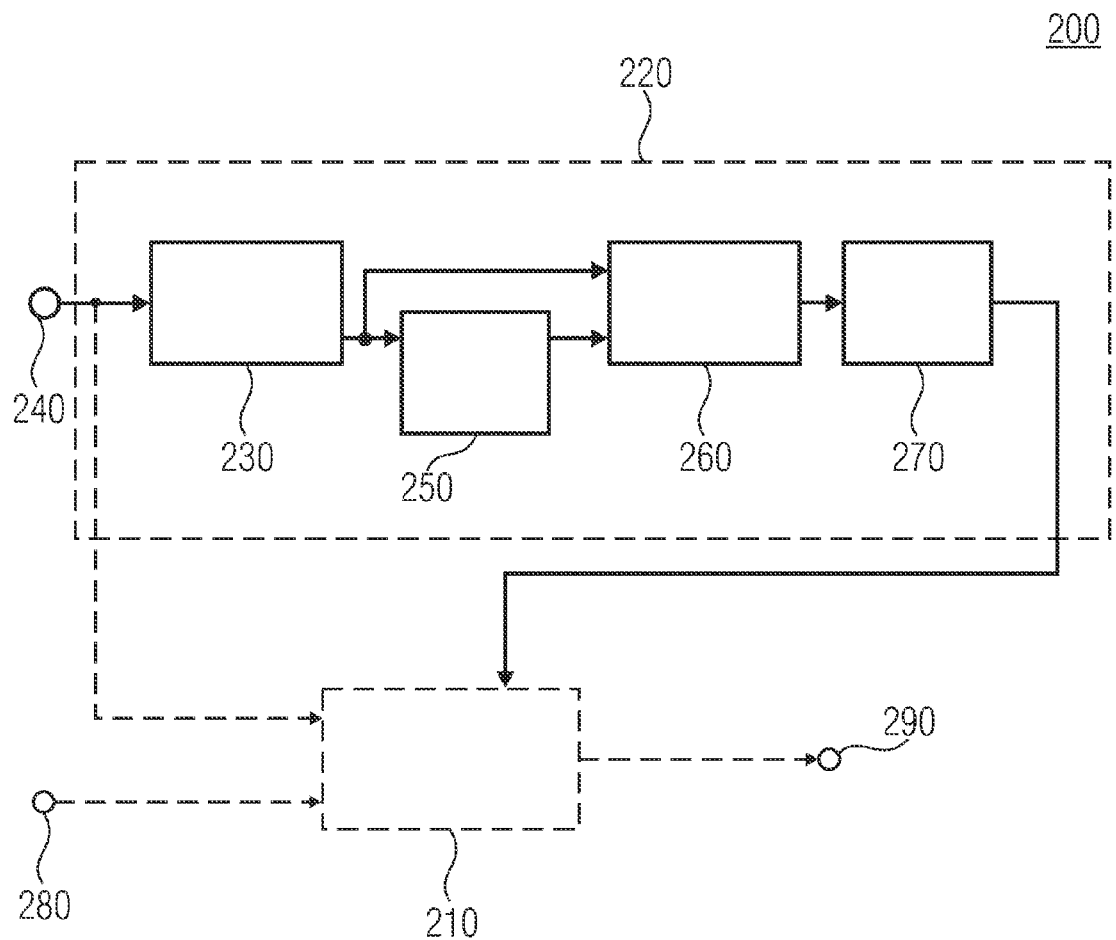
FIG. 2 shows a block circuit diagram of an apparatus for computing control information for an acoustic suppression filter, according to an embodiment of the present invention.

FIG. 2 shows a block circuit diagram of an apparatus for computing control information 200 for an acoustic suppression filter 210, which is represented in dashed lines in FIG. 2 as an optional component. The apparatus 200 here includes computation means 220, which in turn comprises value determination means 230 coupled, at an input, to an input 240 of the means 200. A mean value determination means 250 is coupled to an output of the value determination means 230, on the one hand, and a modification means 260 to a first input in a manner parallel thereto. An output of the mean value determination means 250 is coupled to a second input of the modification means 260. Via an output, the modification means 260 is coupled to an input of a control information computation means 270 outputting and providing the control information for the acoustic suppression filter 210 at an output, which at the same time also is an output of the apparatus 200.

To this end, the acoustic suppression filter 210 comprises an input for the control information. Depending on the concrete implementation of the system in which the apparatus 200 and the acoustic suppression filter 210 are implemented, the signal provided at the input 240 may also be provided to the suppression filter 210 on the input side. In addition or as an alternative hereto, however, a further signal may also be provided thereto at an optional input 280. One or both signals provided to the acoustic suppression filter 210 in this way are filtered, taking the control information provided to the suppression filter 210 into account, and output at an output 290.

Regarding the functioning of the apparatus 200 for computing the control information for the acoustic suppression filter 210, at least one signal is provided thereto at the input 240, which may be the above-mentioned loudspeaker signal, the above-mentioned microphone signal, or a signal derived from one of these or both. As will still be explained in greater detail in the following, of course also more than one signal may be provided to the apparatus 200.

The signals provided to the apparatus 200 here comprise temporally successive data blocks, which are also referred to as frames. In embodiments of the present invention, the downstream means and units each operate on one or more data blocks, wherein, in the case of operation on several data blocks, with respect to the temporal sequence of the data blocks, past data blocks are taken into account additionally. This reflects a typical application scenario of apparatuses 200 according to embodiments of the present invention, which are often employed to enable or also realize corresponding echo suppression in real time.

If a corresponding signal is provided to the apparatus 200 at the input 240, at least one corresponding data block reaches the value determination means 230, which in turn computes an energy-related value for at least one band-pass signal. Here band-pass signals are frequency-related signals, such as are provided by an analysis Fourier filter bank, a sub-band analysis filter bank or also a QMF analysis filter bank, for example.

A characteristic frequency, which for example represents a lower initial frequency, an upper final frequency, a center frequency or another typical frequency, is associated with each band-pass signal here. If the band-pass signals are spectral values of a Fourier analysis filter bank, for example, a frequency underlying the spectral value concerned may, for example, be regarded as characteristic frequency. In the case of sub-band or QMF signals, which include frequency proportions of a greater frequency range, the characteristic frequency may be one of the above-mentioned typical frequencies.

Depending on the concrete implementation of an apparatus 200 according to an embodiment of the present invention, the value determination means 230 may also output more than one energy-related value for more than one band-pass signal on the basis of the same data block, which is uniquely identifiable by a time index. Thus, it is possible, for example, to determine corresponding energy-related values for a plurality of or all sub-band signals.

The energy-related values may, for example, be an energy value of the band-pass signal concerned or a value proportional thereto. Likewise, it may also be a value proportional to a power of a value of the band-pass signal concerned with a positive, integer exponent, if the value serving as base is a real value. Alternatively or additionally, the energy-related value may also be proportional to a power of a magnitude (absolute value) of the band-pass signal concerned with a positive real number as exponent. For example, this also allows for the use of complex values as base.

The energy-related value(s) thus determined for the at least one band-pass signal now are provided to the mean value determination means 250, which is formed to determine at least one corresponding mean value. In embodiments of the present invention in which more than one energy-related value per data block is provided to the mean value determination means 250, such a mean value may be determined for each or only for a plurality of the values concerned.

As will still be explained in the further course, the mean value determination may here be performed on the basis of a sliding average, which for example is based on the temporally preceding data blocks or a plurality thereof, apart from the current data block. This may, for example, be performed by respectively taking the respective values of the different data blocks into account, or in form of a recursive computation. A concrete implementation will still be explained in the further course.

The at least one energy-related value of the value determination means 230 and the at least one mean value of the mean value determination means 250 now are provided to the modification means 260, which modifies the energy-related value on the basis of the determined mean value for the band-pass signal concerned. In different embodiments of the present invention, this may for example be done by simple subtraction, by simple division, or a more complex mathematical operation based on a subtraction or a division.

Hereby, the modification means 260 generates one or more modified energy-related values, on the basis of which the downstream control information computation means 270 now computes the control information for the acoustic suppression filter 210.

Depending on which signal is provided at the input 240 of the apparatus 200, it may be advisable to provide the same signal or also another signal to the acoustic suppression filter 210 via the optional, further input 280. If the signal provided at the input 240 is the microphone signal, for example, implementation of the further input 280 of the acoustic suppression filter 210 may possibly be omitted. Yet, if the signal provided at the input 240 is the loudspeaker signal, implementation of the further input 280 to which the microphone signal then is provided may indeed be advisable.

It is a weakness of the conventional acoustic echo suppression systems described further above that they do not handle stationary noise in the microphone signal very well. The weakness connected thereto with respect to the audio quality may at least partially, maybe also completely be improved by employing embodiments of the present invention. As will still be shown in the further course, stationary or quasi-stationary noise leads to a systematic estimate deviation with respect to the echo estimation, worsening the performance of these systems in scenarios when the signal-to-noise ratio (SNR) is not very high.

Embodiments of the present invention indeed open up a new technique to address and at least partly eliminate the aforesaid weaknesses of corresponding acoustic echo suppression systems. Not least the embodiment of the present invention shown in FIG. 2 does allow for basically realizing a technique for estimating an echo estimation filter in which the problem of the systematic estimate deviation caused by the presence of noise is reduced.

Embodiments of the present invention thus relate to the computation of an echo estimation filter. They are based on the estimation of time fluctuations of the microphone spectrum, starting from time fluctuations of the loudspeaker spectra. Embodiments of the present invention thus allow for more correct estimation of the echo estimation filters, without introducing systematic estimate deviation by possibly additive noise in the microphone channels. Embodiments of the present invention thus allow for implementation of echo estimation filters on the basis of spectral contribution fluctuations.

Before further embodiments of the present invention will be explained in greater detail in the further course of the present description and also be considered in more detail with respect to their functioning, it is to be pointed out that two components coupled to each other are supposed to mean ones connected directly or indirectly via corresponding connecting means, signal paths or other communication methods. Hence, the previously described means 230, 250, 260 and 270 have all been implemented within the framework of the computation means 220.

Here, it is not necessary for the individual means to be realized by separate circuit blocks. Thus, partial or complete overlaps of circuitry components of the computation means 220 belonging to more than one of the mentioned means may indeed occur. For example, if the computation means 220 is a processor, the same circuits may at least partly be used in different means. Thus, for example, the same parts of an ALU (arithmetic logic unit) may be employed in the value determination means 230, as well as in the modification means 260. In such a case, the coupling of the respective means 230, 260 may for example be realized via a memory location in a memory.

At this point, it also is to be pointed out that functionally equal or functionally similar means, units and objects are designated with similar or equal reference numerals in the following. The same or similar reference numerals also are used for means, objects and units that are equal, similar, functionally equal or functionally similar. For this reason, passages of the description relating to objects, means and units designated with the same or similar reference numerals may be transferred between the individual embodiments of the present invention, which allows for more concise and clear illustration of various embodiments, without having to use unnecessary repetitions.

The summarizing reference numerals used in the further course of the present description also count among the similar reference numerals. If means, objects and elements occur multiple times in one figure, multiple times in one embodiment of the present invention, or multiple times under other circumstances, the individual objects, means and elements will be designated with individual reference numerals, whereas the accompanying summarizing reference numeral will be used in a description, statement or discussion of general features and properties of all corresponding means, objects and units. Thus, for example, the summarizing reference numeral 160 was used for the two indirect overlap paths 160-1 and 160-2. The use of summarizing reference numerals in many cases further is an indication of the fact that the respective means, elements and units thus designated comprise the same or like functional or structural features, unless anything contradictory can be taken from the description of the respective means, objects and elements.

A crucial part of an echo suppression system is the correct estimation of the magnitude or power spectra of the echo signal so that an effective echo suppression filter can be computed. In reference [6], the echo magnitude spectrum is estimated by filtering the correctly delayed loudspeaker magnitude spectrum with the aid of an echo estimation filter.

However, it is first shown that the echo estimation filter computation in reference [6] leads to a systematic estimate deviation whenever there is noise in the microphone signal. Then, a method is proposed to compute the echo estimation filter without the systematic estimate deviation even if there is noise in the signals. This problem of the systematic estimate deviation is addressed by estimating the echo estimation filter on the basis of fluctuations of the signal spectra, as also shown in FIG. 3.

Figure 3:
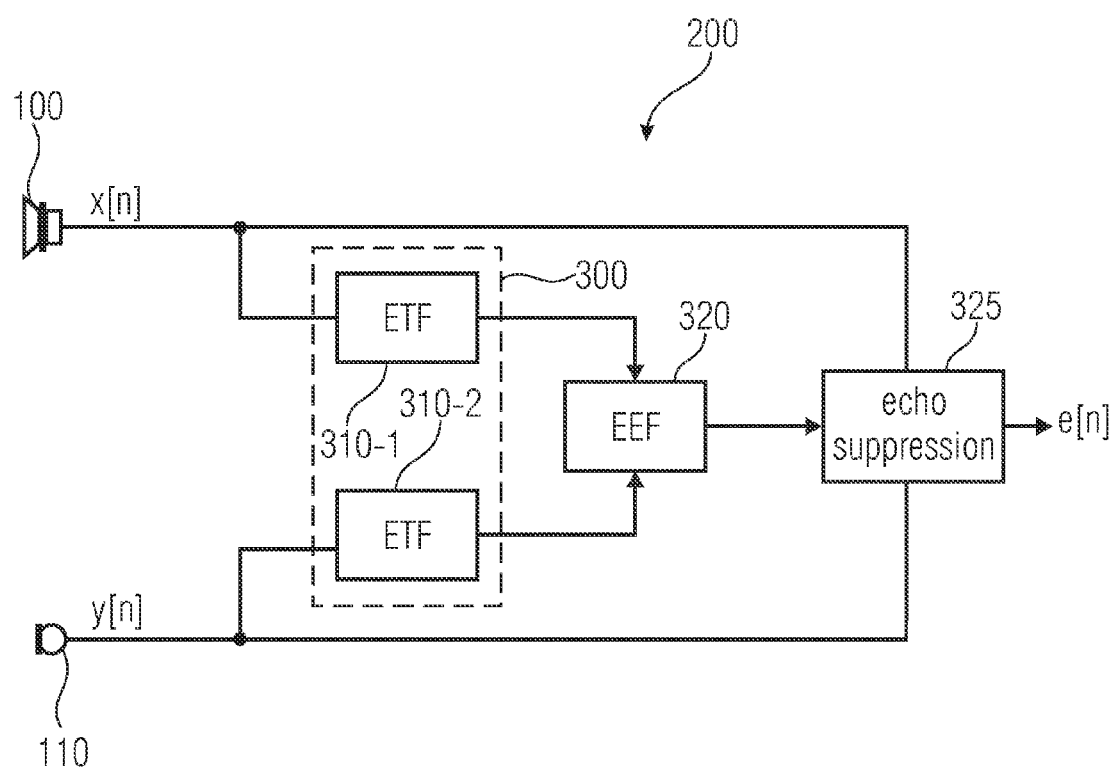
FIG. 3 shows a simplified block diagram for more detailed description of the functioning of embodiments of the present invention.

FIG. 3 shows a simplified block circuit diagram of an apparatus 200 for computing control information for an acoustic suppression filter together with a corresponding acoustic suppression filter not directly implemented in FIG. 3, but as part of a larger circuit. The block circuit diagram shown in FIG. 3 is a simplified diagram in which not all components are shown. On the basis of FIG. 3, rather only the basic functioning of an apparatus according to an embodiment of the present invention and/or a corresponding acoustic suppression filter according to an embodiment of the present invention is to be explained.

Thus, FIG. 3 again shows a loudspeaker 100 reproducing a loudspeaker signal x[n]. This loudspeaker signal is provided to a unit 300. Moreover, FIG. 3 also shows a microphone 110 providing a microphone signal y[n] to the unit 300.

The unit 300, which includes the value determination means 230 and the mean value determination means 250 with respect to the embodiment shown in FIG. 2, is illustrated in slightly different way in FIG. 3. Thus, the unit 300 in FIG. 3 includes two estimation means for temporal fluctuations 310-1, 310-2, which are also designated as ETF (estimation of temporal fluctuation) in FIG. 3. The estimation means 310-1 here is coupled to the loudspeaker 100 on the input side, while the estimation means 310-2 is coupled to the microphone 110 on the input side.

The two evaluation means 310 here at least execute the functional features and properties of the value determination means 230 and the mean value determination means 250 as described in connection with FIG. 2 for the band-pass signals included in the loudspeaker signal and the microphone signal. The embodiment of the apparatus 200 shown in FIG. 3 thus represents an embodiment in which not only a single signal of the group of signals, but at least two signals, namely the loudspeaker signal and the microphone signal, are processed. The two estimation means 310 thus determine the energy-related values for both signals for the corresponding band-pass signals and the accompanying mean values, in the embodiment shown in FIG. 3.

The two estimation means 310 are coupled, at an output each, to corresponding inputs of an echo estimation filter 320, which includes the modification means 260 and the control information computation means 270 with respect to the description of the embodiment shown in FIG. 2. Correspondingly, the echo estimation filter 320 executes the functionality of the two means 260 and 270 described in connection with FIG. 2 on the basis of the energy-related values and the accompanying mean values of both signals x[n], y[n].

The apparatus 200 in FIG. 3 further includes an echo suppression process unit or echo suppression process circuit 325 (ERP=echo removal process), which is also referred to as echo suppression in FIG. 3 and includes the functionality of the acoustic suppression filter 210 from FIG. 2. The echo estimation filter 320 therefore also comprises a corresponding input for the control information to which the control information provided from the echo estimation filter 320 is supplied.

Just like the acoustic suppression filter, the echo suppression process unit 325 then also generates, on the basis of the signals provided thereto, an acoustic signal e[n] based on the microphone signal y[n] and at least partly corrected with respect to the echo generated by the loudspeaker 100. This step often also is referred to as spectral modification, which is why both the acoustic suppression filter 210 (not shown in FIG. 3) and the echo suppression process unit 325 are referred to as spectral modification, since it operates in a frequency-based domain at least in some embodiments of the present invention. With respect to the echo suppression process unit 325, in particular, additional reference is made to the description of FIG. 7.

FIG. 3 thus shows a block circuit diagram of a proposed estimation of the echo estimation filter, wherein the abbreviations ETF and EEF used in FIG. 3 stand for estimation of temporal fluctuations and echo estimation filter, respectively.

For better understanding of the functioning of embodiments of the present invention, the further functioning will now be described in greater detail on the basis of a signal model with reference to the drawings. In the following, it will be assumed here that the acoustic echo path $c_n$ of the acoustic environment from FIG. 1 may be expressed as a combination of a direct transmission path or direct propagation path and an influence of a linear filter $g_n$. The direct propagation path here corresponds to a delay of the loudspeaker signal and of the microphone signal by a delay value of $v$ samples. The linear filter $g_n$ here models the acoustic properties of the environment. Thus, one obtains $$c_n = g_n * \delta[n-v], \quad (1)$$

with $\delta[n]$ denoting a unit impulse, and * denoting the (mathematical) convolution. Assuming that only the far-end speaker is active, the time domain model of the microphone signal $y[n]$ is given by $$y[n] = g_n * x[n-v] + w[n], \quad (2)$$

wherein n again is an integer representing a time index with respect to sampled values of a discrete time course. The variables n occurring in equations (1) and (2) thus are indices in the time domain.

In equation (2), the expression $g_n * x[n-v]$ here denotes the delayed and filtered loudspeaker signal as picked up by the microphone. The contribution $w[n]$ here represents a stationary background noise present in the recording area. By way of a corresponding time-frequency transform, i.e. for example a short-time Fourier transform (SIFT), on both sides of equation (2), one obtains $$Y[k,m] = G[k,m] X_d[k,m] + W[k,m], \quad (3)$$

wherein k is an integer and denotes a data block in form of a data block number (frame number), and wherein m is a frequency index, i.e. also an integer. Here, according to $$X_d[k,m] := X[k-d,m], \quad (4)$$

the corresponding delayed loudspeaker signal in the frequency or SIFT domain is $x[n-v]$, wherein it is assumed here in the present case that v is an integer multiple of a data block shift (frame shift or sample advance value) K. In other words, it is assumed here that the equation $$v = dK \quad (5)$$

applies, wherein v, d and K are corresponding integers. Equation (5) here only represents an assumption allowing for slight simplification of the notation, but by far not representing a strict prerequisite for the validity of the subsequent equations or their technical realization. In the further course of the description, if a delay of signals or frequencies of values are mentioned, it is not necessary to strictly take equation (5) into account.

In yet other words, the continuous, sampled acoustic data stream is divided into data blocks of the length K in the time domain, in some embodiments of the present invention. Of course, in other embodiments, data blocks may also include a higher number of values than the data stream concerned is shifted by. This may for example be achieved by overlaps.

Moreover, the designation G[k,m] in equation (3) is used as the accompanying representation of the filter $g_n$ and/or its impulse response. Correspondingly, W[k,m] designates the representation of the stationary background noise w[n] in the frequency domain. In practice, it is reasonable to assume that x[n] and w[n] are uncorrelated, so that it follows from equation (3) that $$E\{|Y[k,m]|^2\} = E\{|G[k,m]|^2 \cdot |X_d[k,m]|^2\} + E\{|W[k,m]|^2\}, \quad (6)$$

wherein E{ } denotes the mathematical expectation value or a mean value (e.g. arithmetic mean value). As an instantaneous approximation of equation (6), this can be written in form of power spectra $|Y[k,m]|^2$ as $$|Y[k,m]|^2 \approx |G[k,m]|^2 \cdot |X_d[k,m]|^2 + |W[k,m]|^2. \quad (7)$$

Figure 4:
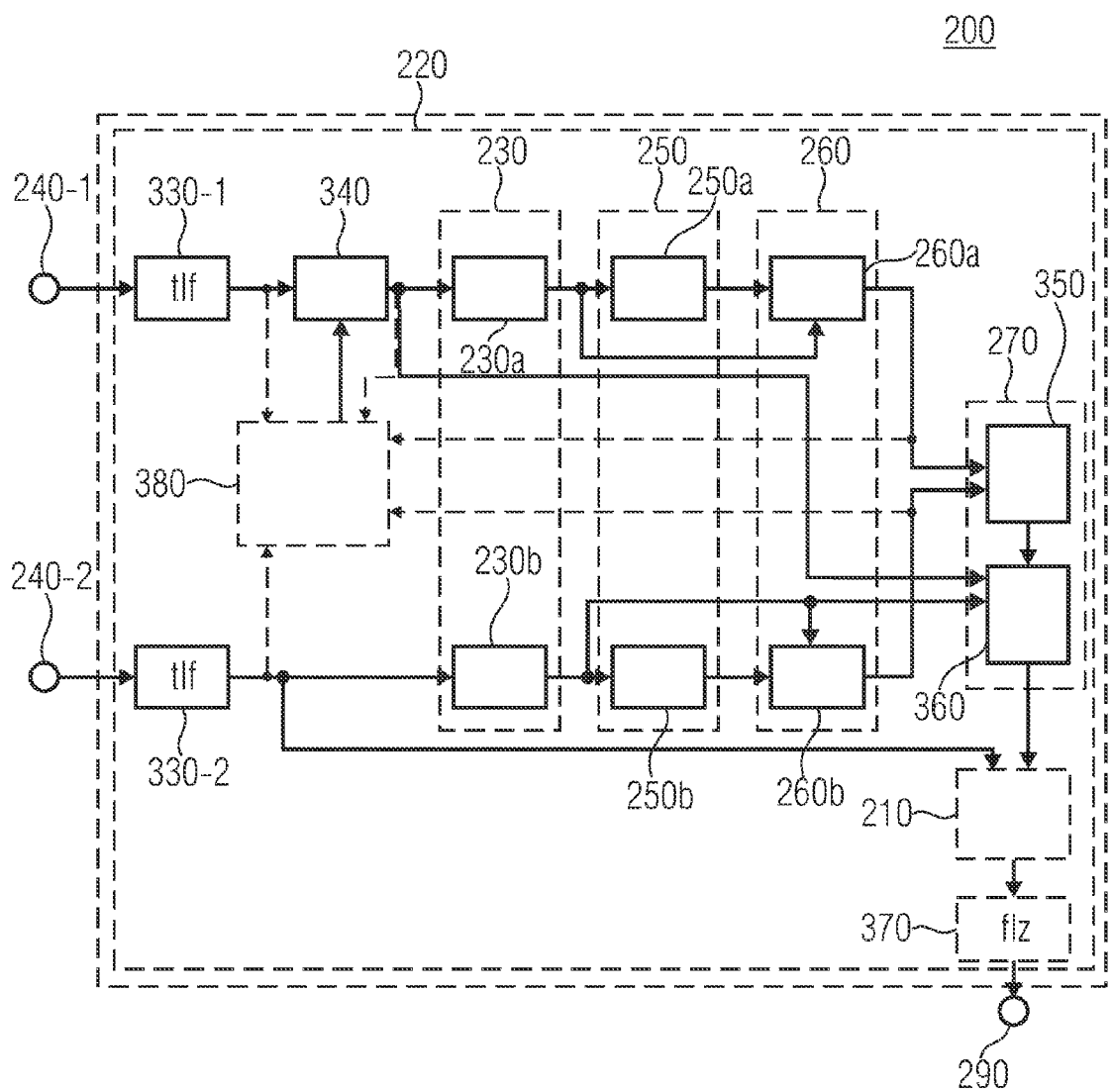
FIG. 4 shows a block circuit diagram of a further embodiment according to the present invention.
Figure 5:
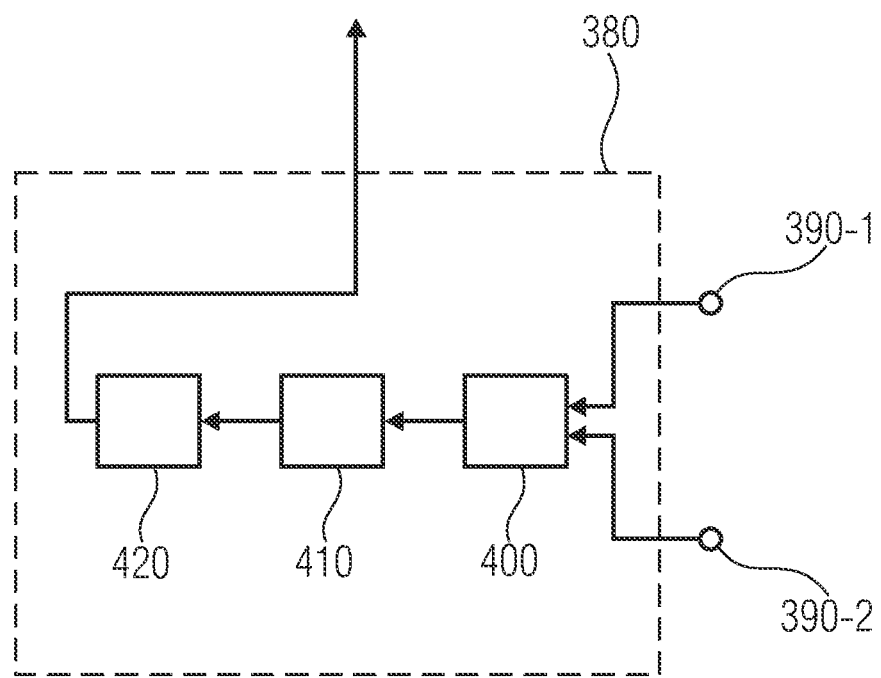
FIG. 5 shows a block circuit diagram of a delay value computation means of the embodiment of the present invention illustrated in FIG. 4.

Based on this signal modeling, further embodiments of the present invention will be described in connection with FIGS. 4 and 5 in form of an apparatus 200 for computing control information for an acoustic suppression filter 210. FIGS. 4 and 5 here show block circuit diagrams, wherein FIG. 5 shows a block circuit diagram of a delay computation means that may be used in the embodiment shown in FIG. 4.

FIG. 4 shows a block circuit diagram of an apparatus 200 for computing control information for an acoustic suppression filter 210. Both the apparatus 200 and the acoustic suppression filter 210 here are embodied as part of a computation means 220, which may for example be a processor or a CPU (central processing unit).

The apparatus 200 here comprises a first input 240-1 and a second input 240-2, wherein the first input 240-1 and the second input 240-2 are provided for a loudspeaker signal in the time domain and a microphone signal in the time domain, respectively. A time/frequency transformation means 330-1, which may for example be a short-time Fourier analysis filter bank, a Fourier analysis filter bank, a sub-band analysis filter bank or also a QMF filter analysis bank, is coupled to the first input 240-1. A delay means 340 formed to forward the signal provided from the time/frequency transformation means 330-1 in delayed fashion is coupled at an output of the time/frequency transformation means 330-1.

On the output side, the delay means 340 is coupled to a value determination means 230, which comprises a first value determination sub-means 230a for the loudspeaker signal, in the embodiment shown in FIG. 4. The value determination means 230 then is coupled to a mean value determination means 250, which itself in turn comprises a mean value determination sub-means 250a, which is coupled both to the output of the delay means 240 and to the output of the value determination sub-means 230a. The mean value determination means 250 as well as the mean value determination sub-means 250a are coupled, at an output, to an input of a modification sub-means 260a of a modification means 260. Via a further input, the modification sub-means 260a here is coupled to the output of the value determination sub-means 230a, so that the original value also is available to the modification sub-means 260a, apart from the determined mean value.

Apart from this first path for the loudspeaker signal, the apparatus 200 comprises a second path, which is coupled to the second input 240-2 for the microphone signal. More specifically, a second time/frequency transformation means 330-2 here is coupled to the second input 240-2 on the input side. On the output side, it then is coupled to a second value determination sub-means 230b, which also is embodied as part of the value determination means 230. The mean value determination means 250 also comprises a mean value determination sub-means 250b for the microphone signal, which is coupled to both the output of the time/frequency transformation means 330-2 and to an output of the second mean value determination sub-means 230b on the input side. The mean value determination sub-means 250b, just like the mean value determination means 250a, is coupled to an input of the modification means 260. The mean value determination sub-means 250b here is coupled to a second modification sub-means 260b, which is also part of the modification means 260. Via a further input, the modification sub-means 260b here is coupled to the output of the value determination sub-means 230b, so that the original value is available to the modification sub-means 260b, apart from the determined mean value.

By means of its two modification sub-means 260a, 260b, the modification means 260 itself is coupled to an input of a control information computation means 270, which includes a series connection of an estimation means 350 and a computation means 360 for the actual control information, in the embodiment shown in FIG. 4. In the embodiment of the apparatus 200 shown in FIG. 4, the computation means 360 is further coupled to the outputs of the value determination sub-means 230b and the delay means 340.

Both the control signal provided from the computation means 360 and including the control information and the microphone signal transferred into the frequency domain or a frequency-close domain in the second time/frequency transformation means 330-2, on the basis of which the acoustic suppression filter 210 generates an echo-suppressed signal in the frequency domain or the frequency-close domain and thus performs the spectral modification of the signal, are provided to the acoustic suppression filter 210. The modified signal in the frequency domain or the frequency-close domain then is communicated to a frequency/time transformation means 370 performing back transformation into the time domain. On the output side, it is coupled to an output 290 of the apparatus 200, at which the echo-suppressed or echo-reduced microphone signal is provided in the time domain—in contrast to the embodiment shown in FIG. 2.

Moreover, the embodiment of an apparatus 200 shown in FIG. 4 further includes a delay value computation means 380, which is coupled, at an output, to an input (control input) of the delay means 340 via which it communicates the current delay value or a current correction value for the delay value to the delay means 340. The delay value computation means 380 here is coupled to a path for the loudspeaker signal and the microphone signal each.

Depending on the concrete implementation, this coupling to the two paths, which are merged only behind the modification means 260, may be performed at different locations. Thus, the delay value computation means 380 may, for example, be coupled to the output of the first time/frequency transformation means 330-1, to the output of the delay means 340, or the output of the first modification sub-means 260a of the modification means 260. Furthermore, the delay value computation means 380 may be coupled to the output of the second time/frequency transformation means 330-2 or to the output of the second modification sub-means 260b of the modification means 260, with respect to the microphone signal path.

FIG. 5 shows a block circuit diagram of the delay value computation means 380, as may for example be employed in FIG. 4. The delay value computation means 380 here comprises a first input 390-1 and a second input 390-2, one of which is coupled to the loudspeaker signal path and the other one to the microphone signal path in the embodiment shown in FIG. 4. Thus, for example, the first input 390-1 may be coupled to the output of the delay means 340 with respect to the loudspeaker signal path, and the second input 390-2 to the output of the second time/frequency transformation means 330-2.

The delay value computation means 380 comprises a coherence function computation means 400 coupled to both inputs 390. It is formed to compute a corresponding coherence function on the basis of the signals incoming at the two inputs 390. On the output side, it is coupled to a downstream echo prediction gain computation means 410 formed to compute the corresponding echo prediction gain and output it to an optimization means 420. This optimization means 420 then is coupled to an output 430 of the delay value computation means 380, which itself is coupled to the input of the delay means 340 from FIG. 1 for the corresponding delay value.

The delay value d thus may be computed or determined with the aid of the means shown in FIGS. 4 and 5, using a coherence function, for example a squared coherence function, with respect to the loudspeaker and microphone power spectra according to $$\Gamma_d[k, m] = \frac{(E\{|X[k-d, m]|^2 \cdot |Y[k, m]|^2\})^2}{E\{|X[k-d, m]|^2 \cdot |X[k-d, m]|^2\} \cdot E\{|Y[k, m]|^2 \cdot |Y[k, m]|^2\}}, \quad (8)$$

wherein the expectation value E{ } occurring in equation (8) may also be implemented as mean value. This computation is performed by the coherence function computation means 400 of the delay value computation means 380, in the embodiment shown in FIGS. 4 and 5.

Basically, the delay value d may be computed for each frequency band and/or for each band-pass signal, wherein the band-pass signal is determined by an index m, which is an integer. In the embodiments described in FIGS. 4 and 5, however, only the use of a single delay value for all frequencies and/or all band-pass signals is considered. For this reason, the so-called echo prediction gain ω[k] is computed in the echo prediction gain computation means 410 as a mean value of the coherence functions $\Gamma_d[k,m]$ across the individual frequencies according to $$\omega_d[k] = \frac{1}{M} \sum_{m=0}^{M-1} \Gamma_d[k, m], \quad (9)$$

wherein M is an integer indicating the number of frequency bands and/or band-pass signals. The index m of the individual bands here ranges from 0 to M−1. The actual delay value d then is chosen so that the echo prediction gain is maximized, via the optimization means 420. In other words, this is determined by the means 420 according to $$d = \mathrm{argmax}_d\{\omega_d[k]\}, \quad (10)$$

wherein the function argmax$_d${ } denotes the determination of exactly the maximum value with respect to the parameter d.

Hereby, as illustrated in FIG. 4, the current delay value d as a function of the current waveforms is communicated to the delay means 340 via the delay value computation means 380. More specifically, the connection of the delay value computation means 380 described here is a feedback circuit in which the signal made available to the delay means 340 tends to represent a correction signal with respect to the delay value d, since the delayed signal already is taken into account in the computation of the coherence functions. Basically, it therefore is also possible to denote the delay value, as computed according to equation (10), with Δd, which represents the deviation from the previously computed delay value. Taking it into account may be done by the delay means 340 to obtain the absolute delay value d. In the case of a computation on the basis of non-delayed signals, however, the respective delay value can be determined directly via equation (10).

With respect to the echo estimation filter, the following will show that the estimation used in reference [6] leads to an estimation shifted by a systematic estimate deviation. In reference [6], the estimation of the echo estimation filter is performed directly based on the power spectra $|Y[k,m]|^2$ and $|X_d[k,m]|^2$, i.e. on the microphone and loudspeaker spectra directly measured and detected. In the energy domain, the following is obtained for the echo estimation filters $\hat{G}_{biased}[k,m]$ $$|\hat{G}_{biased}[k,m]|^2 = \frac{E\{|Y[k,m]|^2 \cdot |X_d[k,m]|^2\}}{E\{|X_d[k,m]|^2 \cdot |X_d[k,m]|^2\}}. \quad (11)$$

As shown in Appendix A, the use of equation (11) leads to an estimate shifted by a systematic estimate deviation for the echo estimation filter due to the additive proportion of the stationary noise W[k,m]. Thus, on the basis of equation (11), the echo estimation filter in the energy domain results as $$|\hat{G}_{biased}[k,m]|^2 = |G[k,m]|^2 + \frac{\sigma_W^2[k,m]}{E\{|X_d[k,m]|^2\}}, \quad (12)$$

wherein $\sigma_w^2[k,m]$ is the variance of the stationary noise w[n] within a frequency band with the index m and the data block index or time index k. Here, it immediately results from (12) that the echo estimation filter shifted by the systematic estimate deviation potentially leads to unacceptably high estimations for the echo signal in noisy environments. Since an overestimation of echo signals typically results in too aggressive an echo suppression, the disturbances in near-end speech signals would be unacceptably high during simultaneous bi-directional communication (double talk situations).

When making use of embodiments of the present invention, as illustrated in FIGS. 4 and 5, for example, the echo estimation filter G[k,m] is estimated with respect to temporal fluctuations of the loudspeaker and microphone power spectra. The temporal fluctuations of the power spectra here are determined as "centered" or averaged versions, i.e. reducing or—more generally—taking into account the corresponding mean values. Thus, in the modification means 260, a modified power spectrum is computed by the second modification means 260b as modified energy-related values for the microphone signal according to $$\tilde{Y}[k,m] = |Y[k,m]|^2 - E\{|Y[k,m]|^2\}. \quad (13)$$

Correspondingly, a modified power spectrum for the loudspeaker signal also is computed by the modification means 260 in form of the first modification sub-means 260a according to $$\tilde{Y}_d[k,m] = |Y_d[k,m]|^2 - E\{|X_d[k,m]|^2\}. \quad (14)$$

The mathematical expectation values E{ } entering the equations (13) and (14) here are formed by the mean value determination means 250. Here, conveniently, the mathematical expectation value E{ }, as used in the equations above, is replaced by a short-time mean value by the two mean value determination sub-means 250a and 250b on the basis of the corresponding power-related values. Starting from the example of $$\Phi_{AB}[k,m] = E\{A[k,m] \cdot B[k,m]\}, \quad (15)$$

wherein the values A[k,m] and B[k,m] may represent arbitrary, even equal values, the short-time mean value $\hat{\Phi}_{AB}[k,m]$ with respect to the value $\Phi_{AB}[k,m]$ is obtained by performing, for example, a recursive smoothing according to $$\hat{\Phi}_{AB}[k,m] = (1-\alpha_{avg})\hat{\Phi}_{AB}[k-1,m] + \alpha_{avg}A[k,m] \cdot B[k,m]. \quad (16)$$

The factor $\alpha_{avg}$ here determines the degree of smoothing over time and may be adapted to any given requirement.

In other words, a temporal mean value can be computed for an arbitrary quantity A[k,m], wherein k is a time index, according to $$E(A[k,m]) = (1-\alpha_{avg})E(A[k-1,m]) + \alpha_{avg} \cdot A[k,m], \quad (17)$$

wherein the quantity E(A[k,m]) is computed recursively on the basis of the current value A[k,m] and the previously computed mean value E(A[k-1,m]). The factor $\alpha_{avg}$ here weights the contribution of the addition of the new value A[k,m] relative to the previously computed mean value, which itself is weighted by the factor $(1-\alpha_{avg})$.

Thus, with the aid of the computation rules given in equations (15) to (17), a corresponding mean value may be determined in the mean value determination means 250 and its two mean value determination sub-means 250a and 250b from the corresponding data made available to these means. Implementation of a computation rule according to equations (15) to (17) here represents a recursive, sliding average which may be executed in real time. In particular, one does not have to wait for "future" data blocks here.

The control information computation means 270 with the estimation means 350 now is capable of computing the control information for the acoustic suppression filter 210 on the basis of the modified energy-related values provided from the modification means 260. To this end, at first an echo estimation filter $\hat{G}[k,m]$ is computed by the estimation means 350, taking the temporal fluctuations of the power spectra into account, according to $$|\hat{G}[k,m]|^2 = \frac{E\{\tilde{Y}[k,m] \cdot \tilde{X}_d[k,m]\}}{E\{\tilde{X}[k,m] \cdot \tilde{X}_d[k,m]\}}. \quad (18)$$

More specifically, the magnitude frequency course of the corresponding echo estimation filter $\hat{G}[k,m]$ is computed according to equation (18), wherein the associated phase information may also be added and/or estimated by means of various methods. As far as it may be useful, a constant phase as phase information may thus be used, for example, for all frequency bands, frequency ranges or band-pass signals, determined as a function of the delay value d for the corresponding frequency band or determined from the temporal course or the spectral course of the corresponding magnitudes.

By this estimation, as performed in equation (18), only spectral dynamics of the loudspeaker signal and of the microphone signal are used to estimate the echo estimation filter. As also illustrated in Appendix B, the additive stationary noise signal w[n] is canceled out by the estimation according to equation (18). As shown in the derivation in Appendix B, the use of equation (18) leads to a non-shifted estimation of the echo power transfer function |G[k,m]|². More specifically, thus $$|\hat{G}[k,m]|^2 = |G[k,m]|^2. \tag{19}$$

Moreover, it is to be pointed out here that, as an alternative to using equation (8), the estimation of the delay value d may also be performed on the basis of the fluctuating spectra, using the coherence function according to $$\tilde{\Gamma}_d[k,m] = \frac{\left(E\{\tilde{X}[k-d,m] \cdot \tilde{Y}[k,m]\}\right)^2}{E\{\tilde{X}[k-d,m] \cdot \tilde{X}[k-d,m]\} \cdot E\{\tilde{Y}[k,m] \cdot \tilde{Y}[k,m]\}}, \tag{20}$$

wherein $\tilde{X}[k-d,m]$ is defined analogously to equation (14). The actual delay value is then chosen on the basis of the echo prediction gain $$\tilde{\omega}_d[k] = \frac{1}{M} \sum_{m=0}^{M-1} \tilde{\Gamma}_d[k,m] \tag{21}$$

such that the echo prediction gain is maximized.

In other words, the delay value computation may also be performed by the delay value computation means 380 using quantities other than the ones designated in connection with the equations (8) and (9). With respect to FIG. 4, this means that other values are provided to the delay value computation means 380 via the optionally drawn paths, so that these are available at the inputs 390. The control information computation means 270 makes the control information available to the acoustic suppression filter 210 in form of filter coefficients H[k,m] based on design parameters β, γ and $L_H$, which will be introduced in greater detail in the following.

In embodiments of the present invention, band-pass signals of the loudspeaker signal or a signal derived therefrom, which belong to different characteristic frequencies, may be delayed to a different extent. For example, this may be advisable when the different propagation paths have a frequency-selective attenuation, so that the direct propagation path does no longer provide the strongest signal contribution in certain frequency ranges. In such a case, the determination of the delay value may be performed directly on the basis of the coherence functions and/or on the basis of a computation of the echo prediction gains done via a limited frequency band.

The acoustic echo suppression is performed by the acoustic suppression filter 210 by weighting the microphone signal with an appropriate echo suppression filter according to $$E[k,m] = H[k,m] \cdot Y[k,m]. \tag{22}$$

The microphone spectrum Y[k,m] here is provided to the acoustic suppression filter 210 directly from the output of the second time/frequency transformation means 330-2. The weighting factors and/or filter factors H[k,m] here represent the control information the acoustic suppression filter 210 obtains from the computation means 360 for the control information and/or from the control information computation means 270.

The echo estimation filter H[k,m] and/or the control information may here be computed according to the spectral subtraction method, as described in reference [7]. The control information may in this case be given by $$H[k,m] = \left( \frac{\max\left(|Y[k,m]|^\gamma - \beta |\hat{Y}[k,m]|^\gamma, 10^{\frac{\gamma L_H}{20}}\right)}{|Y[k,m]|^\gamma} \right)^{\frac{1}{\gamma}}. \tag{23}$$

The design parameters β, γ and $L_H$ are used to control the desired performance of the echo suppression filter. Typical values here are β=2, γ=2 and $L_H$=−60 (corresponds to a maximum attenuation of −60 dB). The estimation of the power spectrum of the echo here is obtained by the echo estimation filter according to $$|\hat{Y}[k,m]|^2 = |\hat{G}[k,m]|^2 \cdot |X_d[k,m]|^2. \tag{24}$$

The computation according to equation (24) may also be performed by the computation means for the control information 360. Advantageously, the echo estimation and the echo suppression are performed with respect to the original spectra of the loudspeaker signal and of the microphone signal.

Figure 6:
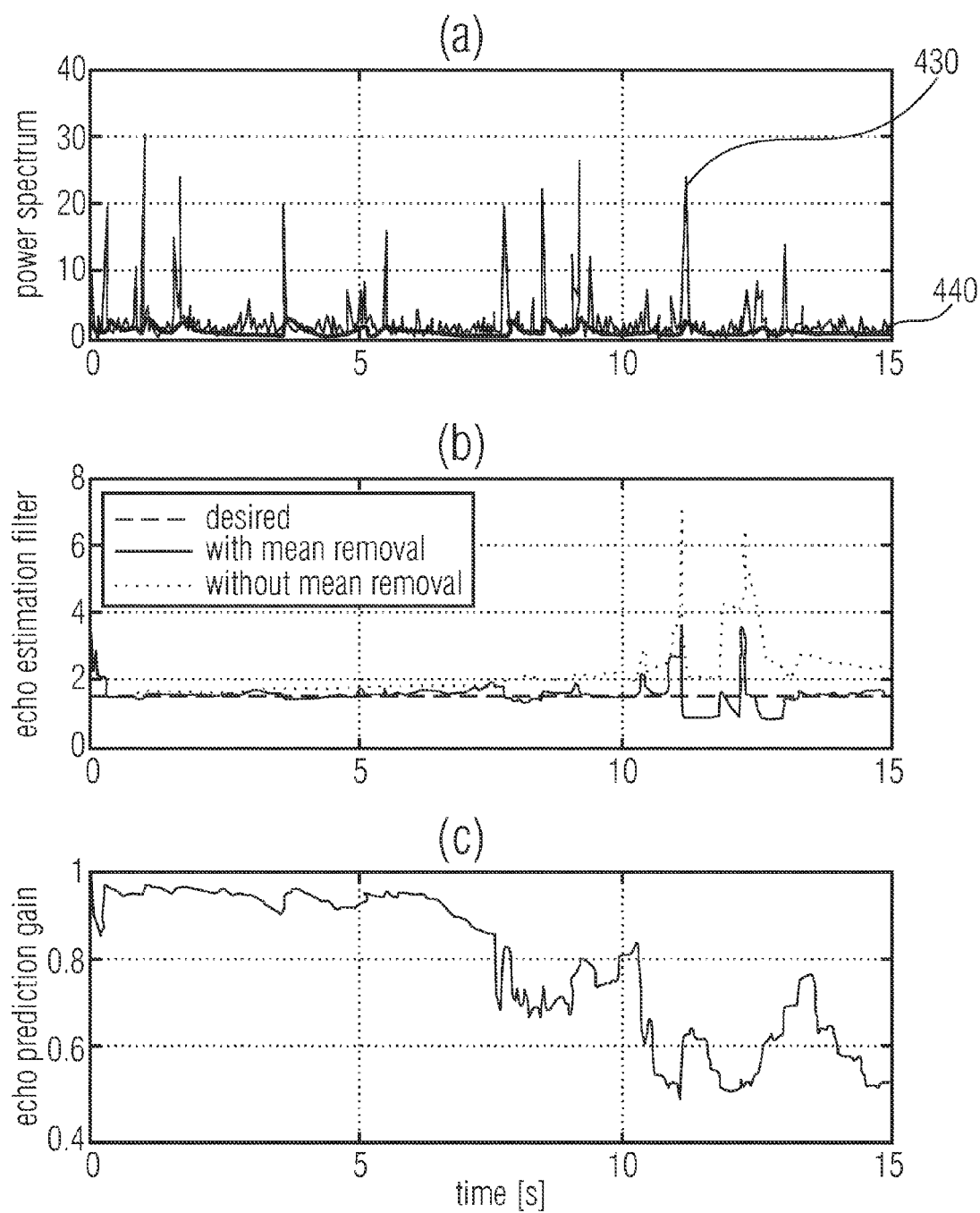
FIG. 6a shows a temporal course of a short-time spectrum as well as a time-averaged value thereof of a loudspeaker signal at 1000 Hz.
FIG. 6b shows a comparison of various echo estimation filters.
FIG. 6c shows a temporal course of a factor, the echo predictability gain.

FIG. 6 shows numerical results on the basis of embodiments of the present invention for a frequency of 1000 Hz. The simulations were generated with speech signals corrupted by 1/f noise (pink noise) with a signal-to-noise ratio (SNR) of 6 dB. The first half of the simulation here exclusively corresponds to an echo caused by an active far-end speaker, whereas the second half of the simulation corresponds to a bi-directional talk situation (double-talk situation).

Part a of FIG. 6 shows a short-time power spectrum 430 and a short-time-averaged spectrum of the loudspeaker signal for a frequency of 1000 Hz superimposed thereon as a black line. In other words, FIG. 6a shows a short-time power spectrum 430 and a corresponding short-time-averaged spectrum 440 for a loudspeaker signal.

Partial illustration b here shows the real echo estimation filter as a dashed line, as well as the estimation with the systematic estimate deviation illustrated in dotted manner and the one without the systematic estimate deviation drawn as a solid line. In other words, the partial illustration in FIG. 6b shows the real echo estimation filter G[k,m] as dashed line, the estimation computed with systematic estimate deviation $\hat{G}_{biased}$[k,m] according to equation (11) as dotted line, as well as the estimation $\hat{G}$[k,m] computed without systematic estimate deviation as a solid line, computed as proposed and described in embodiments of the present invention and the description.

Partial illustration 6c shows a temporal course of the echo prediction gain, wherein all three partial illustrations are based on a time scale of 0 seconds (0 s) to 15 seconds (15 s) each. As explained before, only speech from the loudspeaker is included in the time range from 0 s to about 7.5 s, which is again picked up via the echo and the microphone, whereas in the second half, i.e. the time interval between about 7.5 s and 15 s, speech is additionally coupled into the microphone.

Partial illustration 6c thus corresponds to the echo prediction gain, which represents a measure of the reliability of the echo estimation filter as a function of time. These plots show the systematic estimate deviation of the echo estimation filter computed without taking the centered statistics into account, whereas the echo estimation filter on the basis of the temporal fluctuations corresponds to the real echo estimation filter G[k,m], when the echo prediction gain is sufficiently large. In particular, it is illustrated that, taking the mean value removal into account, the echo estimation filter has a clearly better matching with the desired course as compared with the one without mean value removal. In particular, in the time range between 10 and 15 s in partial illustration 6b, there are significant differences recognizable with respect to the corresponding echo estimation filter courses.

Figure 7:
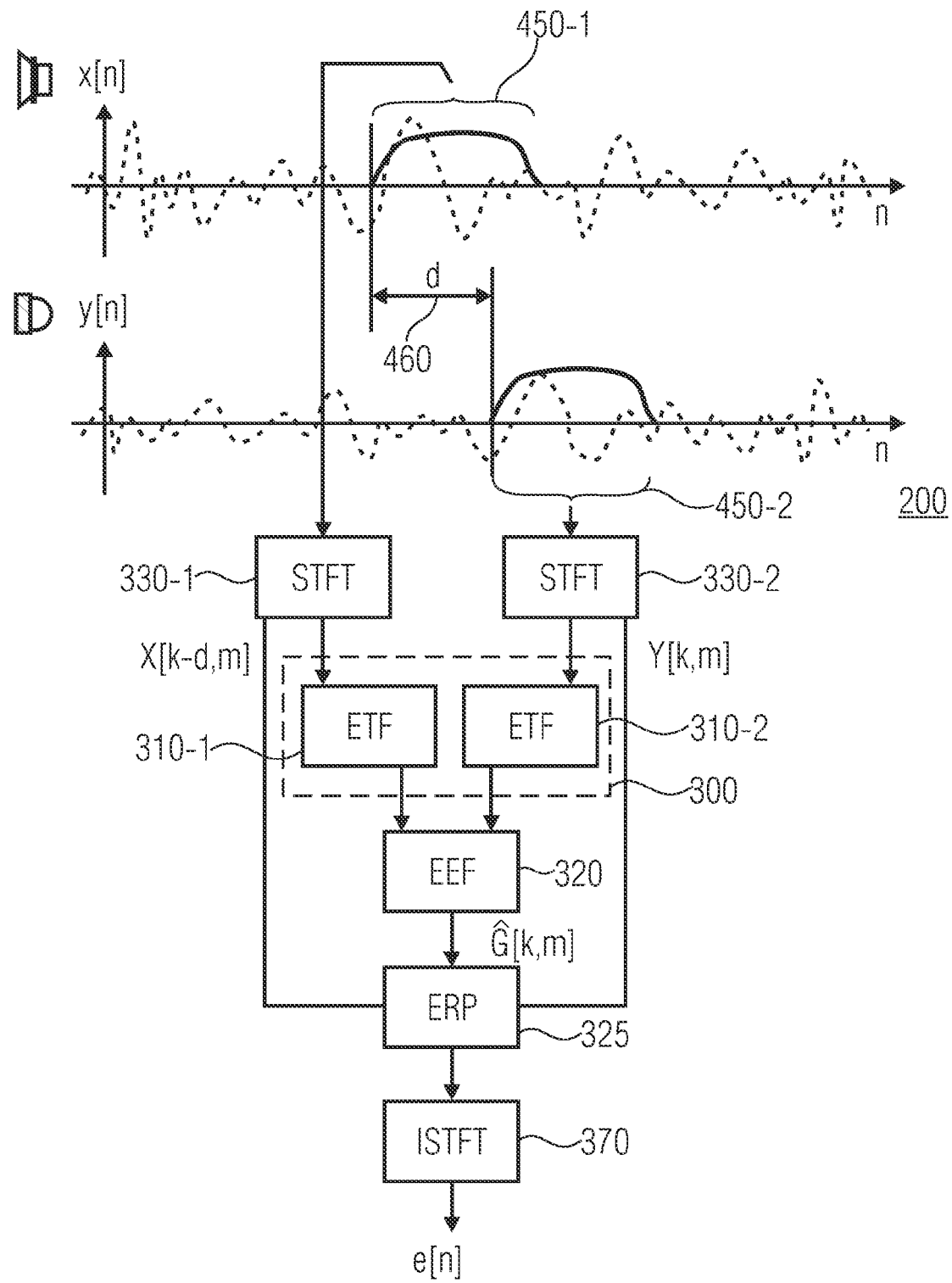
FIG. 7 shows a block diagram of a further embodiment according to the present invention.

FIG. 7 shows a simplified block circuit diagram of a further embodiment of an apparatus 200 with an acoustic suppression filter 210. The illustration chosen in FIG. 7 additionally shows two time courses of the microphone signal y[n] and of the loudspeaker signal x[n] over the time index n. As compared with the embodiment shown in FIG. 3, FIG. 7 thus shows a more complete block circuit diagram of the acoustic echo suppression algorithm according to an embodiment of the proposed invention. Due to the similarity with the embodiment shown in FIG. 3, the description of this embodiment is kept shorter at this point, and reference is made to the statements on FIG. 3 with respect to additional details.

The loudspeaker signal x[n] is supplied to a first time/frequency transformation means 330-1 in form of a short-time Fourier transform (STFT). Likewise, the microphone signal y[n] is supplied to a second time/frequency transformation means 330-2, which also is a corresponding STFT unit. As shown in a comparison of the temporal waveforms x[n] and y[n] of the two waveforms, since the loudspeaker signal leads the microphone signal by a time interval d, the first time/frequency transformation means 330-1 generates a correspondingly time-delayed spectrum of the loudspeaker signal X[k−d,m].

With respect to the two time courses in the upper part of FIG. 7, this also is represented by the use of the two braces 450-1 and 450-2 as well as by the arrow 460 indicating the time interval d. The second time/frequency transformation means 330-2, however, provides the corresponding spectrum of the microphone signal Y[k,m] in not time-delayed form. With respect to FIG. 4, this means that the delay means 340 also is integrated into the first time/frequency transformation means 330-1, in the embodiment shown in FIG. 7.

The two time/frequency transformation means 330-1 in turn are coupled to a unit 300, which includes—as already shown in the embodiment illustrated in FIG. 3—two estimation means 310-1, 310-2, which are referred to as ETF in FIG. 7. Here, the abbreviation ETF stands for estimation of temporal fluctuations. The estimation means 310 thus include the functions of the value determination means 230 and the mean value determination means 250 from FIG. 4.

On the output side, the unit 300 in turn is coupled to an echo estimation filter 320, which again is designated with EEF (echo estimation filter) in FIG. 7. The echo estimation filter 320 here includes the functionalities of the modification means 260 and the estimation means 350 of the control information computation means 270. The echo estimation filter 320 hands the corresponding estimation $\hat{G}[k,m]$ over to an echo suppression process unit 325 (ERP=echo removal process), which performs the actual echo removal on the basis of the two spectra X[k−d, m] and Y[k,m] and the estimated filter $\hat{G}[k,m]$. With respect to its function, the echo suppression process unit 325 thus corresponds to the computation means 360 for the control information as well as the actual acoustic suppression filter 210.

At its output, the echo suppression process unit 325 provides an echo-suppressed signal residing in the frequency domain, which is then treated by the frequency/time transformation unit 370, which is an inverse short-time Fourier transform (ISTFT) in the present case, so that a corresponding time signal e[n] reduced with respect to the echo is output at its output.

A comparison of the embodiments shown in FIGS. 3 and 7 with the embodiment shown in FIGS. 4 and 5 clearly illustrates that the individual means and modules may indeed be implemented differently with respect to their functionalities. Thus, individual steps may be regrouped by corresponding mathematical conversions. Thus, for example, implementation of the equations (22) to (24) may also be summarized differently than described in the above description in echo suppression process unit 325. Thus, for example, the respective computations may be performed within one computation process or also in several, differently subdivided computations.

Figure 8:
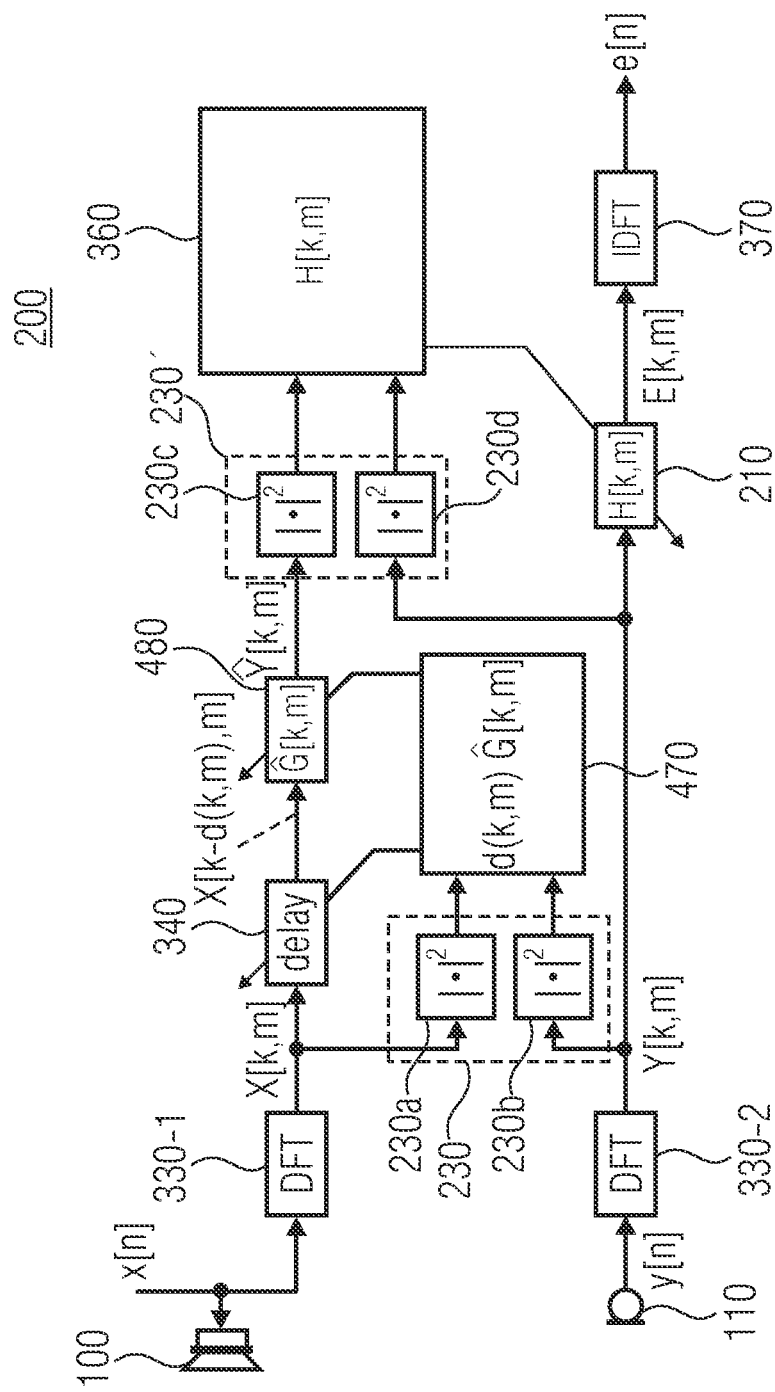
FIG. 8 shows a block diagram of an embodiment according to the present invention.

FIG. 8 shows a further embodiment according to the present invention in form of an apparatus 200 for computing control information for an acoustic suppression filter 210, which is also included in the apparatus 200. The embodiment shown in FIG. 8 here emphasizes that embodiments may also be implemented and embedded in other acoustic echo suppression approaches. Another embodiment, which represents a second different approach with respect to the embedding of the acoustic echo suppression approach, is described in FIG. 9.

FIG. 8 here shows a block diagram of an acoustic echo suppression approach according to an embodiment of the present invention, wherein the echo estimation filter $\hat{G}[k,m]$ is applied to the input signal spectrum X[k,m].

The apparatus 200 comprises a loudspeaker 100 as well as a microphone 110. The loudspeaker signal x[n] is supplied to a time/frequency transformation means 330-1 in form of a discrete Fourier transform analysis bank (DFT=discrete Fourier transform), which transfers the signal into the frequency domain. At its output, it outputs the spectrum X[k,m], which is provided to a delay means 340, on the one hand, and a first value determination sub-means 230a of a value determination means 230, on the other hand. The spectrum X[k,m] may here be real-valued or also complex-valued.

Correspondingly, the microphone signal y[n] of the microphone 110 is supplied to a second time/frequency transformation means 330-2, which outputs a corresponding real-valued or complex-valued spectrum Y[k,m] at its output. It is supplied to a second value determination sub-means 230b of the value determination means 230, on the one hand, and directly supplied to an acoustic suppression filter 210 as an input signal, on the other hand.

The two value determination sub-means 230a, 230b here are formed to generate a magnitude square of the respective spectra and provide same to a unit 470 performing estimation of the filter $\hat{G}[k,m]$ and an estimation of the delay value d(k,m), according to an embodiment of the present invention. The unit 470 thus partly takes over the tasks and functions of the mean value determination means 250, the modification means 260 and the delay value computation means 380. Hence, these are at least partially included in the corresponding circuits and elements of the unit 470. For this reason, the unit 470 is coupled to an input of the delay means 340 to provide the current delay value d(k,m) (=d) to the delay means 340. With respect to the determination of the filter $\hat{G}[k,m]$, this may for example be implemented in accordance with equation (18).

The delay means 340 generates, from the spectrum X[k,m] supplied thereto, a delayed version X[k−d(k,m)m]. This delayed loudspeaker spectrum then is made available to an echo estimation filter 480, which is coupled to the delay means 340.

Moreover, the echo estimation filter 480 is also coupled to the unit 470, via which it obtains the actual echo estimation filter in form of the associated filter coefficients. The echo estimation filter 480 thus performs the functionality of equation (24) in the embodiment shown in FIG. 8, and hence is to be understood as part of the control information computation means 270.

With respect to the phase location of the echo estimation filter $\hat{G}[k,m]$, it may be estimated from the spectral, temporal or a combination of both. Furthermore, there is the possibility, of course, of determining the phase location in another way, for example by associating a fixed phase location with each of the coefficients. For example, a phase of 0° may thus be associated with every single one of the coefficients $\hat{G}[k,m]$.

The echo estimation filter 480 filters the incoming signal, so that the signal $\hat{Y}[k,m]$, which is made available to a computation means for the control information 360 via a further value determination sub-means 230c of a further value determination means 230', is provided at an output. Analogously, the microphone spectra Y[k,m] output by the second time/frequency transformation means 330-2 also are provided to a fourth value determination sub-means 230d of the value determination means 230', which in turn also is coupled to the computation means for the control information 360 at an output. The two value determination sub-means 230c and 230d in turn are formed to compute a magnitude square of the spectra made available thereto. The further value determination means 230' may here functionally be regarded as part of the control information computation means 270 not shown in FIG. 8.

The computation means for the control information 360 here also again is formed to compute the echo suppression coefficients H[k,m] and make same available to the acoustic suppression filter 210 via a corresponding control input.

As already explained before, since the output of the second time/frequency transformation means 330-2 also is coupled to the input of the acoustic suppression filter 210, it is capable of computing an echo-suppressed spectrum E[k,m] and make same available to a downstream frequency/time transformation means 370 in form of an inverse discrete Fourier transform filter bank. This frequency/time transformation means, which also is referred to as synthesis filter bank, provides an echo-suppressed time signal e[n] at its output.

The embodiment shown in FIG. 8 thus allows for echo estimation on the basis of the loudspeaker spectrum. As shown in FIG. 8, the delay and/or the delay value d[k,m] and the echo estimation filter $\hat{G}[k,m]$ are applied to the loudspeaker spectrum X[k,m] to obtain an estimation of the echo spectrum $\hat{Y}[k,m]$. The echo suppression filter H[k,m] then is computed on the basis of the power or the magnitude of the spectrum of the estimated spectrum $|\hat{Y}[k,m]|^2$ and the power or magnitude spectrum of the microphone signal Y[k,m].

It is to be pointed out here that, in the case of the echo estimation filter being determined with respect to a critical band, as this will still be explained in the further course, a corresponding interpolation may be performed so as to obtain a version of the echo estimation filter residing in the SIFT domain.

Figure 9:
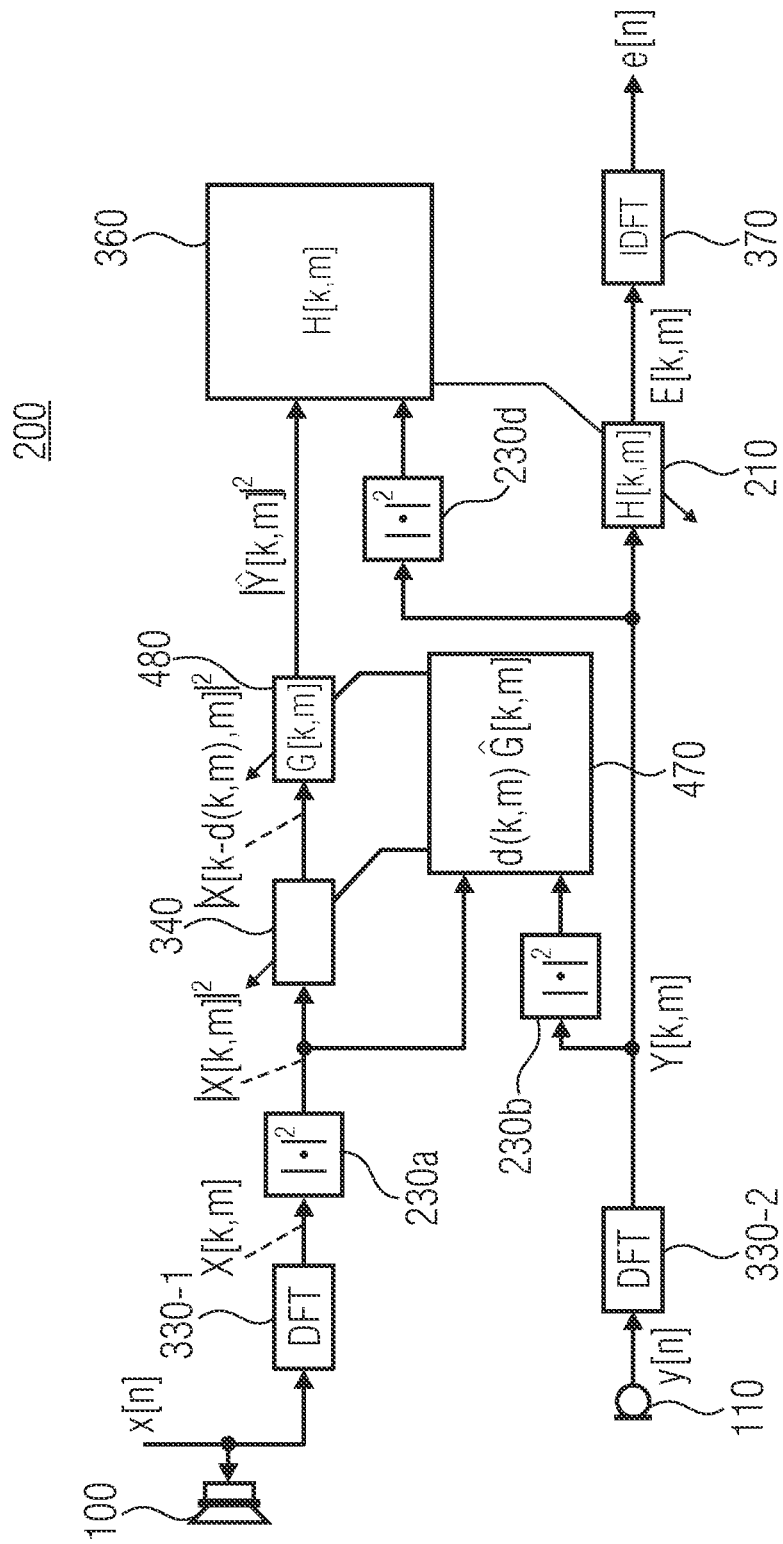
FIG. 9 shows a block diagram of an apparatus for computing control information and of an acoustic suppression filter, according to an embodiment of the present invention.

FIG. 9 shows a further embodiment of the present invention in form of an apparatus 200 together with an acoustic suppression filter 210, which is also implemented in the apparatus 200. In contrast to the embodiment shown in FIG. 8, the one shown in FIG. 9 is based on an approach of acoustic echo suppression, wherein the echo estimation filter $\hat{G}[k,m]$ is applied to the power spectrum of the input signal $|X[k,m]|^2$.

Moreover, the embodiments shown in FIGS. 9 and 8 differ with respect to their structural features, but only to a very small extent. More specifically, they substantially differ with respect to the arrangement of the value determination sub-means 230a and 230c. For simplifying the illustration, the value determination means 230, 230' are not shown in FIG. 9.

More specifically, the value determination sub-means 230a now is connected directly downstream of the first time/frequency transformation means 330-1, so that the power spectrum of the loudspeaker signal X[k,m] already is supplied not only to the unit 470, but also to the delay means 340. Correspondingly, the delay means 340 also generates a delayed form of the power spectrum, and the echo estimation filter 480 a corresponding magnitude frequency course in accordance with equation (24), which is then provided directly to the computation means for the control information 360 without additional value determination sub-means 230c. In other words, by moving the value determination sub-means 230a "upstream of" the delay means 340, implementation of the third value determination sub-means 230c may be omitted. Likewise, targeted definition or determination of the phases or phase locations of the echo estimation filter $\hat{G}[k,m]$ may be saved here.

Furthermore, the two embodiments of the present invention shown in FIGS. 8 and 9, however, do not differ significantly from each other. Deviations due to other supplied signals and information of the individual means may result only regarding some functional features and some computation rules.

FIG. 9 thus shows echo estimation on the basis of the loudspeaker power spectrum or loudspeaker magnitude spectrum. This represents an alternative approach in which the delay value d(k,m) and the echo estimation filter $\hat{G}[k,m]$ are applied to the power or magnitude spectrum $|X[k,m]|^2$ of the loudspeaker signal to obtain an estimation for the power or magnitude spectrum $\hat{Y}[k,m]$ of the echo signal.

As compared with the approach discussed in connection with FIG. 8, the echo suppression filter H[k,m] thus again is computed on the basis of the power or magnitude spectrum of the estimated echo magnitude $|\hat{Y}[k,m]|^2$ and the power or magnitude spectrum of the microphone signal $|Y[k,m]|^2$.

In the embodiments shown in FIGS. 8 and 9, the delay values d(k,m) may vary both with respect to the time and also with respect to the current frequency. Of course, the delay values used in the delay means 340 may be chosen to be identical for the individual band-pass signals and/or frequency ranges.

Figure 10:
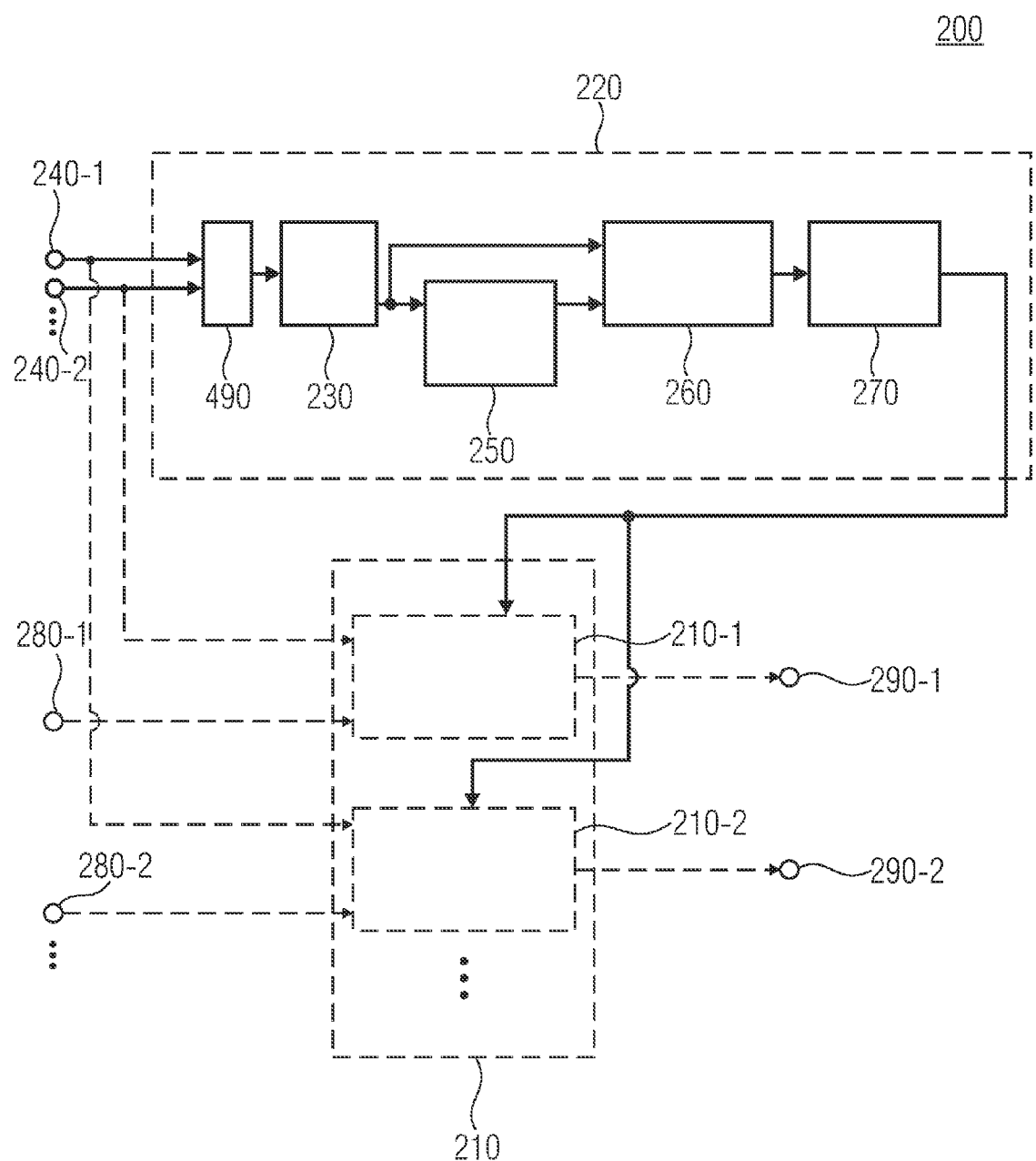
FIG. 10 shows a block diagram of an apparatus for computing control information for an acoustic suppression filter for several channels, according to an embodiment of the present invention.

FIG. 10 shows a further embodiment of the present invention, which is similar to the embodiment shown in FIG. 2 with respect to its structure. The embodiments shown in FIGS. 10 and 2, however, differ in that the embodiment shown in FIG. 10 is an apparatus 200 for a multi-channel variant. Structurally speaking, the embodiments shown in FIGS. 2 and 10 thus only differ slightly, which is why reference again is made to the description in connection with FIG. 2.

In contrast to the embodiments of an apparatus 200 shown in FIG. 2, however, the embodiment 200 shown in FIG. 10 comprises a plurality of inputs 240-1, 240-2, ..., which allow for providing the apparatus 200 with a plurality of a corresponding input signals of the group of signals, as defined previously. Thus, the inputs 240-1, 240-2, ... of the plurality of inputs are coupled to a combination means 490 generating a single, combined signal from the signals incoming at the inputs 240, which then is made available to the further components of the apparatus 200. More specifically, this combined signal of the combination means 490 again is made available to a value determination means 230, a mean value determination means 250, a modification means 260 and a control information computation means 270, which in turn provides corresponding control information, as this was described above.

The embodiment shown in FIG. 10 further differs from the one shown in FIG. 2 in that the acoustic suppression filter 210 now includes sub-filters 210-1, 210-2, . . . , which also may be supplied with the input signals provided at the inputs 240 of the means 200 or also with other signals also provided to the apparatus 200 via optional additional inputs 280-1, 280-2, . . . , depending on the concrete implementation of the corresponding embodiment. In other words, depending on the concrete implementation, every single sub-filter 210-1, 210-2 of the acoustic suppression filter 210 may be provided with a signal made available at the inputs 240-1, 240-2, . . . or an optional other signal. Such a signal could be provided to the filters 210-1, 210-2 via a corresponding optional input 280-1, 280-2, . . . .

The control information of the control information computation means 270, however, is made available to all sub-filters 210-1, 210-2, . . . of the acoustic suppression filter 210 in parallel. Hence, all sub-filters 210 are coupled to the output of the control information computation means 270 correspondingly. The individual sub-filters 210-1, 210-2, . . . provide the echo-reduced output signals at corresponding outputs 290-1, 290-2, . . . to which same are coupled.

While embodiments of the present invention have previously only been discussed for a single-channel case where only one loudspeaker signal and one microphone signal are available, the multi-channel case now also is considered. As will still be described in the following, embodiments of the present invention are not limited to the single-channel case, but may also be applied to acoustic multi-channel echo suppression systems analogously.

Let $X_l[k,m]$ denote the SIFT domain representations of a l-th loudspeaker signal, a joined power spectrum for all loudspeaker channels at first is computed via the combination means 490 by combining the spectra of the individual loudspeaker signals according to $$|X[k,m]|^2 = \sum_{l=0}^{L-1} |X_l[k,m]|^2. \tag{25}$$

Here, L denotes the number of loudspeaker channels, and l and index of the channels ranging from 0 to L−1. However, this is a non-negative integer.

Analogously, a joined power spectrum for the microphone channels is computed according to $$|Y[k,m]|^2 = \sum_{p=0}^{P-1} |Y_p[k,m]|^2, \tag{26}$$

wherein $Y_p[k,m]$ denotes a signal of a p-th microphone, and P as a natural number represents the number of microphones. The index p denotes the individual microphone signals and ranges from 0 to P−1. The indices l and p, like the previously described index m, thus each are in the value range from 0 to L−1, P−1 and M−1, respectively.

Combinations, as for example contained in equations (25) and (26), may be implemented by the corresponding combination means, also using other computation or determination rules. If there is a division by the parameters L and P in the equations (25) and (26), respectively, it is an arithmetic averaging, for example. For this reason, the combination means partly also are referred to as averaging means.

The desired model for the power spectra for the echoes is given analogously to equation (7) by $$|Y[k,m]|^2 \approx |G[k,m]|^2 \cdot |X_d[k,m]|^2 + |W[k,m]|^2, \tag{27}$$

wherein the power spectra $|X[k,m]|^2$ and $|Y[k,m]|^2$ are given by equation (25) and (26) in the multi-channel case. Of course, also signals correspondingly delayed in time are generated here, as described above.

For determining the echo estimation filters $|G[k,m]|^2$, as described before, a corresponding approach is used, in which the joined loudspeaker and joined microphone power spectra are used, however, as they are defined above. The same also applies for the estimation of the delay values d, which are computed for the joined power spectra of the loudspeaker channels each.

The actual echo suppression then is performed separately for each microphone signal, but by using the same echo suppression filters for each of the microphone channels. Hence, $$E_p[k,m] = H[k,m] \cdot Y_p[k,m] \tag{28}$$

applies, with p=0, 1, . . . , P−1. Correspondingly, as described in connection with FIG. 10, a corresponding echo-reduced signal was at first determined in the frequency domain $E_p[k,m]$ for each of the microphone signals, which signal may then be transferred into the time domain.

In the embodiment shown in FIG. 10, of course, different numbers of signals provided at the inputs 240 and signals provided at the inputs 280 may be used. It only makes sense to implement a corresponding separate acoustic suppression sub-filter 210 for each of the signals to be processed, unless parallel computation and further processing of channels is desired.

Of course, embodiments of the present invention may also be combined such that only one microphone signal is combined with a plurality of loudspeaker signals, so that the additional components are implemented only with respect to the loudspeaker signals. Analogously, one may also utilize an implementation in which only one loudspeaker signal faces a plurality of microphone signals. While the first situation may be encountered in automobile hands-free telephone systems, for example, in which the speech of the other end is output via the HiFi system of the vehicle, the second scenario is possible in the case of a conferencing system with a single central loudspeaker and a microphone for each party. The numbers of the loudspeaker signals and of the microphone signals may here of course be identical with or different from each other.

Before the frequency resolution of the respective embodiments of the present invention will be explained and alternatives will be discussed in connection with FIGS. 12 and 13, an embodiment of a filter 500 will at first be described in connection with FIG. 11, which also illustrates that the individual means also are adaptable flexibly with respect to their circuitry and process implementation.

Figure 11:
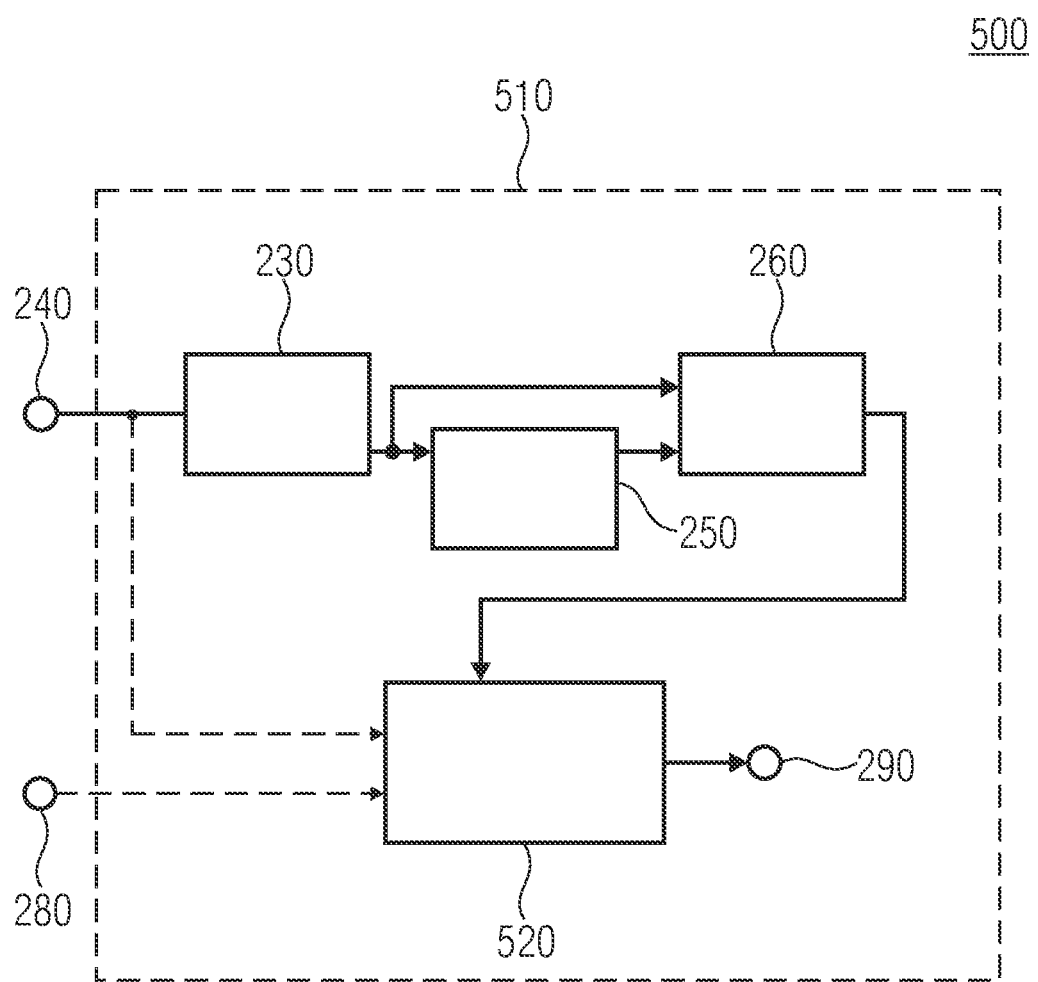
FIG. 11 shows a block diagram of a further acoustic suppression filter according to an embodiment of the present invention.

The acoustic suppression filter 500, as shown in FIG. 11, here largely corresponds to the apparatus 200 shown in FIG. 2 in connection with the acoustic suppression filter 210. Thus, the acoustic suppression filter 500 in FIG. 11 also comprises an input 240 having a computation means 510 very similar to the computation means 220. Via an input 240, a signal of the previously described group of signals is supplied to a value determination means 230, which is part of the computation means 510. An output of the value determination means 230 is coupled to a mean value determination means 250 on the one hand, and to a modification means 260 on the other hand. An output of the mean value determination means 250 also is coupled to the modification means 260. In this respect, the structural description and the functional connections of the acoustic suppression filter 500 are not different from those of the apparatus 200 up to this point in time.

However, an output of the modification means 260 now is coupled to an input of an acoustic suppression filter means 520, which corresponds to the acoustic suppression filter 210 with respect to its functionality. In contrast to the acoustic suppression filter 210 from FIG. 2, the acoustic suppression filter unit 520, however, also is directly coupled to the input 240 or an optional further input 280 to filter one of the respective signals on the basis of the modified energy-related values received from the modification means 260. Correspondingly, the acoustic suppression filter means 520 is coupled to an output 290 at which the echo-reduced signal may be output.

The embodiment of an acoustic suppression filter 500 shown in FIG. 11 thus differs from an embodiment of an apparatus 200, as shown in FIG. 2, for example, in that parts of the functionality of the apparatus 200 are included in the actual acoustic suppression filter and/or the acoustic suppression filter means 520. In other words, this means that the acoustic suppression filter means 520 includes the functionality of the control information computation means 270 shown in FIG. 2. As already explained before, functional and/or structural softening with respect to the previously described blocks may occur here.

With respect to the frequency resolution, it may also be advisable to depart from the spectral resolution by one SIFT unit. The uniform spectral resolution of an SIFT often is not well adapted to human perception. Therefore, it may be advantageous to group the uniformly spaced spectral coefficients $|X[k,m]|^2$ and $|Y[k,m]|^2$ into a number of non-overlapping partitions or groups, as this is illustrated in reference [8], wherein the bandwidths mimic the frequency resolution of the human auditory system. In this connection, reference also is made to reference [9].

For a sampling rate of 16 kHz, the use of a DFT filter bank of the length 512 and the use of 15 partitions may represent a suitable choice, wherein each partition has a bandwidth of about two times the equivalent rectangular bandwidth (ERB), as described in reference [9]. The bands correspond to the partitions, as this is illustrated in FIG. 12.

Figure 12:
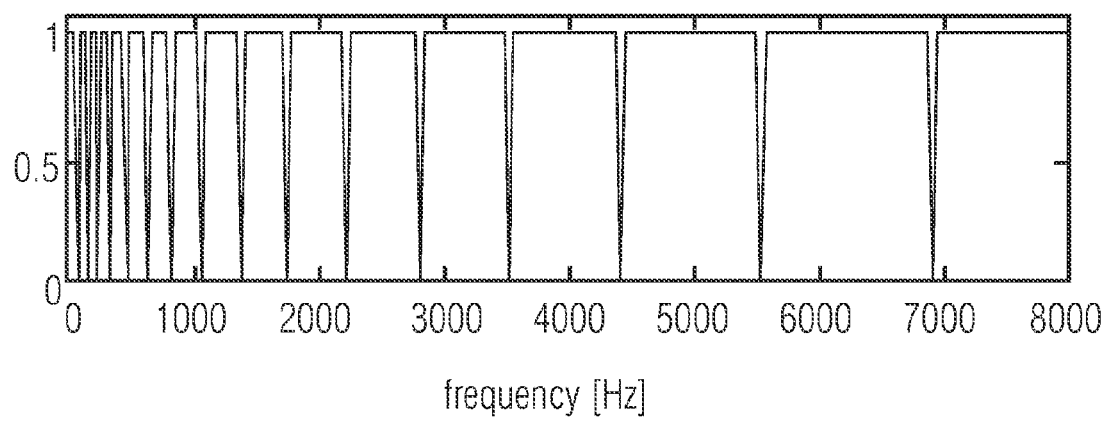
FIG. 12 shows a grouping of a uniform short-time Fourier transform filter bank in groups of frequencies.
Figure 13:
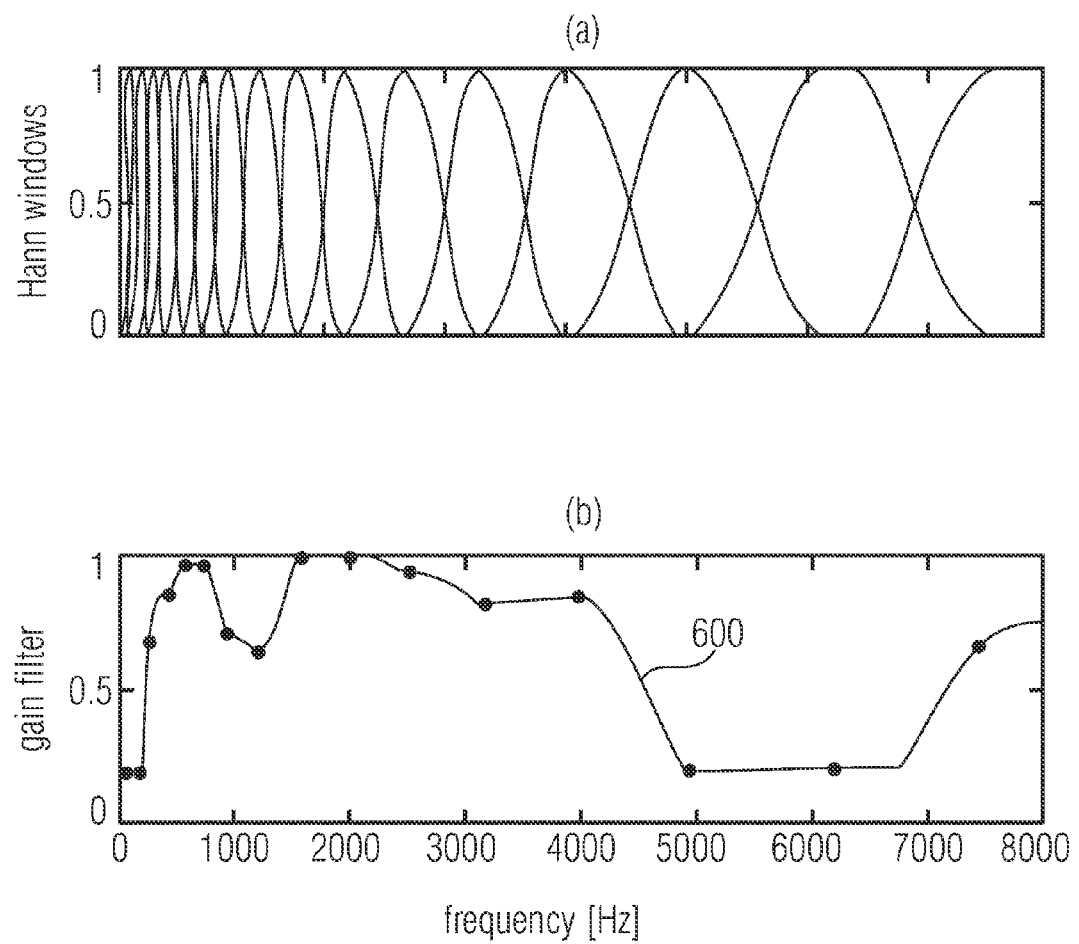
FIG. 13a shows a course of Hann interpolation filters.
FIG. 13b shows a comparison of gain filter coefficients as a function of the frequency.

Thus, FIG. 12 shows how the spectral coefficients of a uniform SIFT spectrum may be grouped in partitions mimicking the non-uniform frequency resolution of the human auditory system. Thus, FIG. 12 shows, as a function of the frequency between 0 Hz to 8000 Hz, an arrangement of a total of 15 to 16 frequency bands accessible by means of a sampling means operating at 16 kHz. FIG. 12 clearly shows how the corresponding frequency partitions become wider with increasing frequency.

The different gain filters are computed only for the central frequencies of each partition. This additionally leads to less computation complexity as compared with the case of full spectral resolution of a uniform STFT spectrum. Before applying the last partition gain filter to the uniform signal of the STFT spectrum, the corresponding spectrum is interpolated using Hann interpolation filters.

FIG. 13a thus shows potential Hann interpolation filters that may be used for smoothing the gain filters as a function of the frequency. FIG. 13b shows corresponding gain filter coefficients in form of a solid line 600, which may be acquired by interpolation of the values for the gain filters in the partitions, represented by the bold dots in FIG. 13b. Here, the frequency axis illustrated in FIG. 13b on the abscissa also relates to the illustration represented in FIG. 13a.

In other words, partial image 13a illustrates the Hann filters, and partial image 13b shows an example of gain filter values prior to and after the application of a corresponding interpolation. The values before here are represented by the dots, and the interpolation by a line 600. The frequency averaging of the gain filters leads to averaging of the variations of the resulting spectrum as a function of the frequency and thus reduces tonal, musical noise and other artifacts.

Depending on the concrete implementation, embodiments of the present invention may here comprise receiving at least one loudspeaker signal, receiving at least one microphone signal, converting the loudspeaker and microphone signals into short-time spectra, computing corresponding loudspeaker and microphone signal power spectra, filtering the loudspeaker and microphone power spectra to obtain corresponding time fluctuation spectra, computing an echo estimation filter for estimating microphone time fluctuation spectra from the loudspeaker time fluctuation spectrum, using an echo suppression filter for removing the echo in the microphone signal spectrum, and converting the microphone signal spectrum with suppressed echo back into the time domain to attain an echo-removed output signal.

At this point, it again makes sense to point out that the band-pass signals in embodiments of the present invention may, for example, be done by a Fourier transform, a transform into the sub-band domain or by a transform into the QMF domain by corresponding analysis filter banks. A corresponding back-transformation is possible by corresponding synthesis filter banks.

Likewise, it makes sense to point out that different apparatuses may be formed by completely or partly the same circuitry, circuits and objects. Likewise, it makes sense to point out that the microphone signals and the loudspeaker signals generally are different signals. At this point, it is to be pointed out again that the intermediate results obtained in the above-described embodiments do not necessarily have to be generated as such. Rather, embodiments of the present invention may also be implemented using mathematical conversions in which other intermediate results or no intermediate results at all may be directly accessible. Likewise, it is possible to compute the energy-related values on the basis of a derived signal in the case of a multi-channel implementation, but with the further computation being based on the individual signals.

It also is to be pointed out that the above-described structural embodiments in form of apparatuses and systems may also be understood as flowcharts representing individual computation steps, method steps and other steps. In this respect, separate description of methods and apparatuses is not necessary at this point.

In the present description, substantially, electrically digitally encoded audio signals have been considered previously, wherein also delay values are computed in an echo cancellation system to apply same to the loudspeaker signal and/or a signal derived therefrom. As already explained at the beginning, however, there is indeed also a need in other signal processing circuits for determining a corresponding delay value for other signals and maybe delaying a signal by this delay value.

Compensation circuits and compensation apparatuses in which different signals are to be adapted to each other with respect to their runtimes, phase locations or other parameters are to be mentioned here as possible fields of application. Apart from the already mentioned electrically digitally encoded audio signals, also other electrically digitally encoded signals may be in need of a corresponding delay. The same also applies for analog electrical signals, optical analog signals and optically digitally encoded signals. Depending on the concrete implementation, the corresponding information may here be encoded in voltage values, in current values, in frequency values, in phase values, in intensity values or other quantities of electrical or optical signals. Apart from the audio signals already mentioned, for example, video signals, general data signals, but also synchronization signals and other signals may be in need of a corresponding delay.

In spite of the multiplicity of various implementations, embodiments of the present invention in form of an apparatus for determining a delay value primarily on the basis of digitally encoded electrical signals will be described in the further course, wherein corresponding variations of the embodiments for the fields of application mentioned will be explained and described subsequently.

Figure 14:
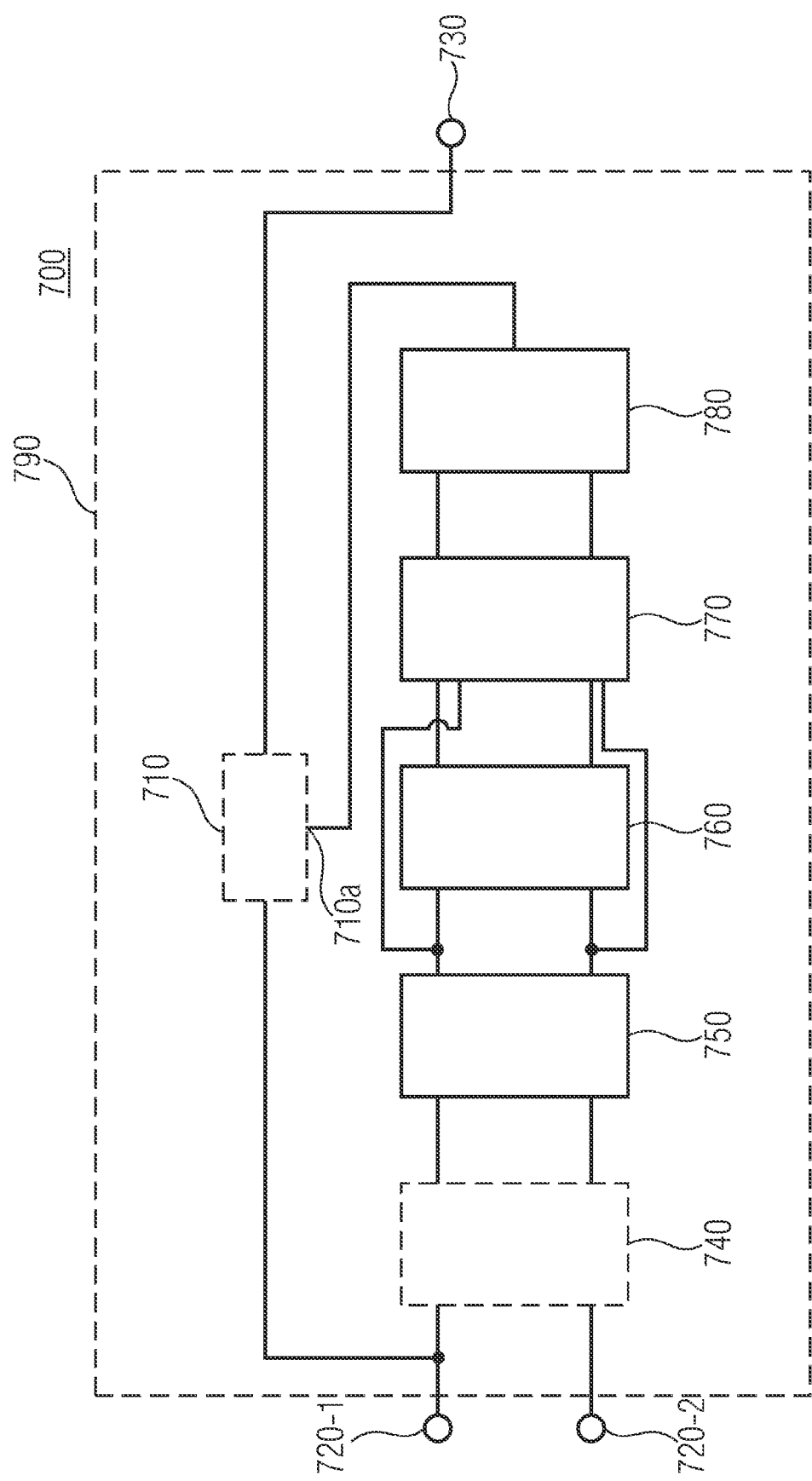
FIG. 14 shows a block circuit diagram of an embodiment of an apparatus for computing a delay value.

FIG. 14 shows an apparatus 700 for computing a delay value d for a delay means 710. The delay means 710 here is a component itself optional for the apparatus 700 and drawn in dashed lines in FIG. 14 as such.

The apparatus 700 here comprises a first input 720-1 and a second input 720-2 for a first and a second signal. As explained before, these signals may be electrically digitally encoded audio signals, but also corresponding other signals. The delay means 710 here is coupled, on the input side, to the first input 720-1 for the first signal. On the output side, the delay means 710 is coupled to an output 730 of the apparatus 700 at which the first signal is output in delayed form. Furthermore, the delay means 710 comprises an input 710a, at which a signal comprising information with respect to a delay value by which the first signal is to be delayed between the input 720-1 and the output 730 is provided. Correspondingly, the delay means 710 is formed to delay the incoming first signal correspondingly by this delay value.

The apparatus 700 further comprises an optional time/frequency conversion means 740 coupled to both inputs 720. It is coupled, at a first and a second output, to a value determination means 750, which in turn is coupled to a mean value determination means 760 and a modification means 770 each via an output for a signal based on the first signal and a signal based on the second signal. The modification means 770 further comprises two additional further inputs, with which it is coupled to the mean value determination means 760 and its two outputs for signals with respect to the first signal and the second signal.

In the embodiment of an apparatus 700 shown in FIG. 14, the modification means 770 also comprises two corresponding outputs coupled to a delay value computation means 780. This in turn comprises an output coupled to the control input 710a of the delay means 710.

As already described in connection with the above-described embodiments of an apparatus 200 for computing control information and an acoustic suppression filter 500, the means described may be part of a computation means 790, which may, for example, be implemented in form of a processor. Optionally, there it is also possible that individual components, for example the delay means 710, are not part of this computation means 790.

With respect to their functionality, the individual means correspond to the means already described before. Thus, for example, the time/frequency conversion means 740 is formed to convert one data block each of the first and second signals into corresponding spectral representations, which then may be processed further in the further apparatus. More specifically, the time/frequency conversion means 740 here outputs one or more band-pass signals for each of the two signals, each having associated one or more characteristic frequencies. The band-pass signals here are associated with a frequency-related domain, which may again be the actual frequency domain, a sub-band domain or the QMF domain, to name only three examples.

With respect to its functionality, the value determination means 750 corresponds to the value determination means 230, so that reference may be made to the previous embodiments here in this respect. In contrast to the value computation means 230 in its most general and simple form, the value determination means 750 of the embodiment of an apparatus 700 shown in FIG. 14, however, is formed to compute, for both signals, at least one energy-related value associated with a band-pass signal. In further embodiments of the present invention, it is further formed to compute a plurality of or corresponding energy-related values for all band-pass signals, i.e. for example energy values or also magnitude values of the corresponding band-pass signals. The various band-pass signals here in turn are associated with different characteristic frequencies, wherein typically band-pass signals corresponding to the same characteristic frequencies are considered for the two signals in such a case.

With respect to its functionality, the mean value determination means 760 corresponds to the mean value determination means 250 from the previously described embodiments, wherein it again determines the corresponding mean values for both signals. For this reason, reference may at this point again be made to the description with respect to the mean value determination means 250.

The same equally applies for the modification means 770, which corresponds to the modification means 260 of the previous embodiments, wherein it also performs the corresponding modifications for both signals.

Finally, the delay value computation means 780 corresponds to the delay value computation means 380 and the unit 470 with respect to the computation values of the delay value d[k,m]. For this reason, with respect to the description, reference also is made to the corresponding description passages with respect to these means and units.

In other words, in embodiments of the present invention, the delay value computation means 780 may, for example, be formed so as to execute the functions described in equations (8) to (10). Correspondingly, in embodiments of the present invention, the modification means 770 may be formed correspondingly so as to implement the functions described by equations (13) and (14). The mean value computation means 760 thus also may basically be understood as implementing the functions defined by equations (15) to (17). The value determination means 750 finally may be understood as a means computing, with respect to the incoming values of the corresponding signals, the energy-related values already explained in connection with FIG. 2 for these.

With respect to its functionality, the delay means 710 not least corresponds to the delay means 340 as well as other components, such as the time/frequency conversion unit 330-1 from FIG. 7, which also implements a corresponding functionality. Likewise, the computation means 790 and 220 may correspond to each other. The same also applies for the inputs 720 and the outputs 730 with respect to the above-described inputs 240, 280 and outputs 290.

As shown in this discussion, many of the apparatuses and acoustic suppression filters shown in FIGS. 1 to 13 also are embodiments of the present invention in form of an apparatus 700, even if these are not designated as such for reasons of simplicity there.

As already mentioned before, embodiments of the present invention in form of an apparatus 700, as this is shown in FIG. 14, for example, may lead to quicker and maybe also improved adaptation of a delay value of the first signal with respect to the second signal. This may, for example, be highly advantageous in runtime compensation problems in which the corresponding differences are not constant in time. This is achieved not least by noise proportions and other stationary, noisy contributions in the frequency-related domain with respect to energy-related values occurring as constant values in form of systematic estimate deviations that can be determined by corresponding averaging. These values may then be considered further in the modification means 770.

As already shown also in FIG. 14, the delay values thus determined may, for example, be employed for delaying the corresponding signals. Apart from the runtime compensation already mentioned multiple times, corresponding delay circuits may also be employed in echo removal systems and other synchronization circuits.

Moreover, it is also possible to implement an apparatus 700 as a multi-channel variant in embodiments of the present invention. In such a case, such a multi-channel variant of an apparatus 700 comprises a plurality of inputs 720-1 for the first signal, a plurality of inputs 720-2 for the second signal, or both, wherein the numbers of the inputs for the first and second signals in the latter case may be identical with or also independent from each other.

In such an apparatus 700, depending on the type of the corresponding first and second signals, an optional time/frequency transformation sub-means may be implemented for one signal each in the time/frequency transformation means 740, in order to perform a transformation into the frequency domain. A combination means combining the incoming first signals and the incoming second signals may be connected between the time/frequency transformation means 740 and the value determination means 750 and/or the accompanying inputs 720 and the value determination means 750, as this was already described in connection with the combination means 490 before. The further processing of the signals then takes place as described above.

Such a multi-channel variant of an apparatus 700 further includes a number of delay means 710, typically corresponding to the number of inputs 720-1 for the first signals. These are coupled, at their control inputs via which they obtain the delay values, in parallel to the delay value computation means 780, so that each of these obtains the same delay value or values.

Of course, the computation of the delay values for each band-pass signal with its characteristic frequency may also be done individually here, for a plurality of band-pass signals, or for all band-pass signals, as this was also already described above. Of course, this may also be implemented in the case of the apparatus 700, as it is shown in FIG. 14, i.e. in a not multi-channel-enabled implementation.

Depending on the conditions, embodiments of the present invention may be implemented in form of methods in hardware or in software. The implementation may be on a digital storage medium, for example a floppy disk, a CD, a DVD or another computer-readable storage medium with electronically readable control signals capable of cooperating with a programmable computer system or processor such that a method according to an embodiment of the present invention is executed. In general, embodiments of the present invention thus also consist in a software program product and/or a computer program product and/or a program product with program code stored on a machine-readable carrier for performing an embodiment of a method, when the software program product is executed on a computer or processor. In other words, an embodiment of the present invention may thus be realized as a computer program and/or software program and/or program with program code for performing an embodiment of a method, when the program is executed on a processor. A processor may here be formed by a computer, a chip card (smart card), an application-specific integrated circuit (ASIC), a system on chip (SOC) or another integrated circuit (IC).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] C. Breining, P. Dreiseitel, E. Hänsler, A. Mader, B. Nitsch, H. Puder, T. Schertler, G. Schmidt, and J. Tilp. Acoustic echo control. IEEE Signal Processing Magazine, 16(4): 42-69, July 1999.
[2] A. N. Birkett and R. A. Goubran. Limitations of handsfree acoustic echo cancellers due to nonlinear loudspeaker distortion and enclosure vibration effects. In Proc. IEEE Workshop on Applications of Signal Processing to Audio and Acoustics, pages 13-16, New Paltz, October 1995.
[3] G. Schmidt and E. Hänsler. Acoustic echo and noise control: a practical approach. Hoboken: Wiley, 2004.
[4] W. L. B. Jeannes, P. Scalart, G. Faucon, and C. Beaugeant. Combined noise and echo reduction in hands-free systems: a survey. IEEE Transactions on Speech and Audio Processing, 9(8): 808-820, November 2001.
[5] C. Faller and J. Chen. Suppressing acoustic echo in a sampled auditory envelope space. IEEE Trans. on Speech and Audio Proc., 13(5): 1048-1062, September 2005.
[6] C. Faller and C. Tournery. Estimating the delay and coloration effect of the acoustic echo path for low complexity echo suppression. In Proc. Intl. Works. on Acoust. Echo and Noise Control (IWAENC), September 2005.
[7] W. Etter and G. S. Moschytz. Noise reduction by noise-adaptive spectral magnitude expansion. J. Audio Eng. Soc., 42: 341-349, May 1994.
[8] C. Faller and F. Baumgarte. Binaural Cue Coding—Part II: Schemes and applications. IEEE Trans. on Speech and Audio Proc., 11(6): 520-531, November 2003.
[9] B. R. Glasberg and B. C. J. Moore. Derivation of auditory filter shapes from notched-noise data. Hear. Res., 47: 103-138, 1990.

Appendix A

Echo Estimation Filter with Systematic Estimate Deviation

In the following, it will be shown that equation (11) proposed in Reference [6] leads to a zero-point-shifted estimate of the echo estimation filter $|G[k,m]|^2$. It will be shown that this zero-point shift is due to the effect of the stationary noise $w[n]$ in the microphone signal.

At first, $$E\{|Y[k,m]|^2|X_d[k,m]|^2\} = E\{|G[k,m]|^2|X_d[k,m]|^2 + |W[k,m]|^2|X_d[k,m]|^2\}$$
$$= |G[k,m]|^2 E\{|X_d[k,m]|^4\} +$$
$$\sigma_W^2[k,m] E\{|X_d[k,m]|^2\},$$

wherein $\sigma_W^2[k,m] = E\{|W[k,m]|^2\}$ is the variance of the stationary noise $w[n]$ within the frequency band with the index m. Furthermore, $$E\{|X_d[k,m]|^2|X_d[k,m]|^2\} = E\{|X_d[k,m]|^4\}.$$

The echo estimation filter according to equation (11) thus yields $$|\hat{G}_{biased}[k,m]|^2 = \frac{E\{|Y[k,m]|^2|X_d[k,m]|^2\}}{E\{|X_d[k,m]|^2|X_d[k,m]|^2\}} \quad (29)$$
$$= |G[k,m]|^2 + \frac{\sigma_W^2[k,m]}{E\{|X_d[k,m]|^2\}}.$$

As can be seen, the stationary noise signal w[n] introduces a zero-point term into the estimation of the echo estimation filter. Furthermore, equation (29) implies that the zero-point shift in the echo estimation filter becomes greater with increasing noise variance.

Appendix B

Echo Estimation Filter without Systematic Estimate Deviation

In the method proposed in the present description, in order to get rid of the zero-point shift introduced into the estimation of the echo estimation filter, the estimation is computed with the aid of centered central statistics $|Y[k,m]|^2$ and $|X_d[k,m]|^2$. Analogously to the procedure in Appendix A, the method proposed here leads to the following expression:

$$E\{\tilde{Y}[k,m]\tilde{X}_d[k,m]\} = E\{(|Y[k,m]|^2 - E\{|Y[k,m]|^2\})$$
$$(|X_d[k,m]|^2 - E\{|X_d[k,m]|^2\})\}$$
$$= E\{(|G[k,m]|^2|X_d[k,m]|^2 +$$
$$|W[k,m]|^2 - E\{|Y[k,m]|^2\}) \cdot$$
$$(|X_d[k,m]|^2 - E\{|X_d[k,m]|^2\})\}$$
$$= E\{(|G[k,m]|^2|X_d[k,m]|^4 -$$
$$|G[k,m]|^2|X_d[k,m]|^2E\{|X_d[k,m]|^2\} +$$
$$|W[k,m]|^2|X_d[k,m]|^2 -$$
$$|W[k,m]|^2E\{|X_d[k,m]|^2\} -$$
$$E\{|Y[k,m]|^2\}E\{|X_d[k,m]|^2\})\}$$
$$= E\{(|G[k,m]|^2|X_d[k,m]|^4 -$$
$$|G[k,m]|^2|X_d[k,m]|^2E\{|X_d[k,m]|^2\})\}$$
$$= |G[k,m]|^2(E\{|X_d[k,m]|^4\} - (E\{|X_d[k,m]|^2\})^2)$$

Furthermore, $$E\{\tilde{X}_d[k,m]\tilde{X}_d[k,m]\} = E\{(|X_d[k,m]|^2 - E\{|X_d[k,m]|^2\})^2\}$$
$$= E\{|X_d[k,m]|^4\} - (E\{|X_d[k,m]|^2\})^2.$$

The echo estimation filter according to equation (18) thus yields $$|\hat{G}[k,m]|^2 = \frac{E\{\tilde{Y}[k,m]\tilde{X}_d[k,m]\}}{E\{\tilde{X}_d[k,m]\tilde{X}_d[k,m]\}}$$
$$= |G[k,m]|^2.$$

Thus, it can be seen that equation (18) leads to a correct estimation of the echo power transfer function in the case of a stationary background noise on the near side, which is contained in the microphone signal.

The invention claimed is:

1. An apparatus for computing filter coefficients for a suppression filter for filtering a first audio signal to suppress an echo based on a second audio signal, comprising:
a computer comprising a value determiner programmed to determine at least one energy-related value for a band-pass signal of at least two temporally successive data blocks of at least one signal of a group of signals, the group of signals comprising the first audio signal, the second audio signal and a signal derived from the first audio signal or the second audio signal;
wherein the computer further comprises a mean value determiner programmed to determine at least one mean value of the at least one determined energy-related value for the band-pass signal;
wherein the computer further comprises a modifier programmed to modify the at least one energy-related value for the band-pass signal on the basis of the determined mean value for the band-pass signal;
wherein the computer further comprises a filter coefficient computer programmed to compute the filter coefficients for the suppression filter on the basis of the at least one modified energy-related value for the band-pass signal; and
wherein the value determiner is programmed so that the energy-related value is proportional to a power of a value of the band-pass signal with a positive, integer exponent, or wherein the value determiner is programmed so that the energy-related value is proportional to a power of a magnitude of the value of the band-pass signal with a positive real number as exponent of the power.

2. The apparatus according to claim 1, wherein the value determiner is programmed to use an energy value or a value proportional to an energy value as energy-related value.

3. The apparatus according to claim 1, wherein the value computer is programmed to determine a plurality of energy-related values for the same data block, but for different band-pass signals with different characteristic frequencies.

4. The apparatus according to claim 1, wherein the value computer is programmed to determine energy-related values for the same data block, but for all band-pass signals with different characteristic frequencies.

5. The apparatus according to claim 4, wherein the mean value determiner is programmed to determine a mean value for each of the determined energy-related values of the band-pass signals, wherein the modifier is programmed to modify each of the determined energy-related values on the basis of the accompanying determined mean value, and wherein the filter coefficients computer is programmed to compute the filter coefficients on the basis of all modified energy-related values.

6. The apparatus according to claim 1, wherein the mean value computer is programmed to determine the at least one mean value on the basis of a sliding average.

7. The apparatus according to claim 6, wherein the mean value computer is programmed to compute the sliding average only on the basis of the current data block of the signal of the group of signals and on the basis of data blocks of the signal of the group of signals lying before the current data block in time.

8. The apparatus according to claim 1, wherein the modifier is programmed to modify the at least one energy-related value on the basis of a subtraction of the determined mean value for the respective band-pass signal.

9. The apparatus according to claim 1, wherein the computer further comprises a time/frequency transformer arranged so that the at least one signal belongs to a frequency-based domain on the basis of the data block of the signal as sub-band signal.

10. The apparatus according to claim 1, wherein the computer is programmed to determine at least one energy-related value each, determine at least one mean value each, modify the at least one energy-related values each on the basis of the respective mean values, and compute the filter coefficients on the basis of the respective modified energy-related values, for at least the first audio signal or a signal based on the first audio signal, as well as the second audio signal or a signal based on the second audio signal.

11. The apparatus according to claim 1, wherein the computer is programmed to provide, on the basis of a plurality of first audio signals, a plurality of second audio signals or a plurality of signals derived from the first audio signals or second audio signals, the at least one signal of the group of signals by combination thereof.

12. The apparatus according to claim 11, wherein the computer is programmed to compute the same filter coefficients for the suppression filter for each signal of the plurality of first audio signals, the plurality of second audio signals or the plurality of signals derived from the first audio signals or second audio signals.

13. The apparatus according to claim 1, wherein the computer further comprises a delayer for at least one of the signals of the group of signals or for at least one energy-related value of a band-pass signal of a signal of the group of signals, wherein the delayer is arranged to delay the respective signal or the respective energy-related value by a delay value.

14. The apparatus according to claim 13, wherein the delayer is arranged so that the delay value is based on at least one modified energy-related value.

15. The apparatus according to claim 13, wherein the delayer is arranged so that the delay value is based on a maximum value of a coherence function, wherein the coherence function is based on at least one modified energy-related value.

16. The apparatus according to claim 13, wherein the delayer is arranged so that delay values for different band-pass signals with respect to different characteristic frequencies are independent from each other.

17. The apparatus according to claim 1, wherein the apparatus or the computer further comprises a suppression filter arranged to filter the second audio signal on the basis of the computed filter coefficients.

18. The apparatus according to claim 1, wherein the apparatus is arranged so that the first audio signal is a loudspeaker signal and the second audio signal a microphone signal.

19. A suppression filter for filtering a second audio signal to suppress an echo based on a first audio signal, comprising:
a computer comprising a value determiner programmed to determine at least one energy-related value for a band-pass signal of at least two temporally successive data blocks of at least one signal of a group of signals, the group of signals comprising the first audio signal, the second audio signal and a signal derived from the first audio signal or the second audio signal;
wherein the computer further comprises a mean value determiner programmed to determine at least one mean value of the at least one determined energy-related value for the band-pass signal;
wherein the computer further comprises a programmed to modify the at least one energy-related value for the band-pass signal on the basis of the determined mean value for the band-pass signal;
wherein the value determiner is programmed so that the energy-related value is proportional to a power of a value of the band-pass signal with a positive, integer exponent, or wherein the value determiner is programmed so that the energy-related value is proportional to a power of a magnitude of the value of the band-pass signal with a positive real number as exponent of the power; and
wherein the computer further comprises an acoustic suppression filter arranged to filter the second audio signal on the basis of filter coefficients, wherein the filter coefficients are based on the at least one modified energy-related value for the band-pass signal.

20. A method of computing filter coefficients of a suppression filter for filtering a second audio signal to suppress an echo based on a first audio signal, comprising:
determining at least one energy-related value for a band-pass signal of at least two temporally successive data blocks of at least one signal of a group of signals, the group of signals comprising the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power;
determining at least one mean value of the at least one determined energy-related value for the band-pass signal;
modifying the at least one energy-related value for the band-pass signal on the basis of the determined mean value for the band-pass signal; and
computing the filter coefficients for the suppression filter on the basis of the at least one modified energy-related value for the band-pass signal.

21. A method of suppression filtering of a second audio signal to suppress an echo based on a first audio signal, comprising:
determining at least one energy-related value for a band-pass signal of at least two temporally successive data blocks of at least one signal of a group of signals, the group of signals comprising the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power;
determining at least one mean value of the at least one determined energy-related value for the band-pass signal;
modifying the at least one energy-related value for the band-pass signal on the basis of the determined mean value for the band-pass signal; and
filtering the second audio signal on the basis of filter coefficients, wherein the filter coefficients are based on the at least one modified energy-related value for the band-pass signal.

22. An apparatus for computing a delay value for a delayer for delaying a first signal with respect to a second signal, comprising:

a computer comprising a value determiner programmed to determine at least one energy-related value for a band-pass signal of the first signal and of the second signal of at least two temporally successive data blocks of the first and second signals, wherein the value determiner is programmed so that the energy-related value is proportional to a power of a value of the band-pass signal with a positive, integer exponent, or wherein the value determiner is programmed so that the energy-related value is proportional to a power of a magnitude of the value of the band-pass signal with a positive real number as exponent of the power;

wherein the computer further comprises a mean value determiner programmed to determine at least one mean value of the at least one determined energy-related value for the band-pass signal for the first signal and for the second signal;

wherein the computer further comprises a modifier for modifying the at least one energy-related value for the band-pass signal of the first and the band-pass signal of the second signal on the basis of the determined mean value for the band-pass signal of the first and seconds signals; and wherein the computer further comprises a delay value computer programmed to compute the delay value on the basis of the modified energy-related values of the first and second signals, so that the delay value is based on a maximum value of a coherence function, wherein the coherence function is based on the modified energy-related values of the first and second signals.

23. The apparatus according to claim 22, wherein the apparatus or the computer further comprises a delayer for the first signal arranged to delay the first signal by the delay value.

24. The apparatus according to claim 22, wherein the apparatus is arranged so that the first signal and the second signal each are a signal of a group of signal types, the group of signal types comprising an analog electrical signal, an analog optical signal, a digital electrical signal and a digital optical signal.

25. The apparatus according to claim 22, wherein the computer further comprises a time/frequency transformer arranged so that the first and second signals belong to a frequency-based domain on the basis of a data block as sub-band signals.

26. The apparatus according to claim 22, wherein the value computer is programmed to determine a plurality of energy-related values for the same data block, but for different band-pass signals with different characteristic frequencies each for the first and second signals, and wherein the mean value determiner is programmed to determine a mean value for each of the determined energy-related values of the band-pass signals, wherein the modifier is programmed to modify each of the determined energy-related values on the basis of the corresponding determined mean value, and wherein the delay value computer is programmed to compute the delay value on the basis of all modified energy-related values of the first and second signals.

27. The apparatus according to claim 22, wherein the computer is programmed to form the first signal by a combination on the basis of a plurality of first signals or a plurality of signals derived from first signals, or the computer is programmed to form the second signal by a combination on the basis of a plurality of second signals or a plurality of signals derived from second signals.

28. The apparatus according to claim 27, wherein the computer is programmed to compute the same filter coefficients for the delayer for each signal of the plurality of first signals or the plurality of signals derived from the first signals.

29. A method of computing a delay value for a delayer for delaying a first signal with respect to a second signal, comprising:

determining at least one energy-related value for a band-pass signal of the first signal and of the second signal of at least two temporally successive data blocks, wherein the energy-related value is proportional to a power of a value of the band-pass signal with a positive, integer exponent, or wherein the energy-related value is proportional to a power of a magnitude of the value of the band-pass signal with a positive real number as exponent of the power;

determining at least one mean value of the at least one determined energy-related value for the band-pass signal of the first signal and of the second signal;

modifying the at least one energy-related value for the band-pass signal of the first signal and of the second signal on the basis of the determined mean value for the band-pass signal of the first and second signals; and computing the delay value on the basis of the modified energy-related values of the first and second signals, so that the delay value is based on a maximum value of a coherence function, wherein the coherence function is based on the modified energy-related values of the first and second signals.

30. A non-transitory computer readable medium including a program with a program code for performing, when the program is executed on a processor, the method of computing filter coefficients of a suppression filter for filtering a second audio signal to suppress an echo based on a first audio signal, said method comprising:

determining at least one energy-related value for a band-pass signal of at least two temporally successive data blocks of at least one signal of a group of signals, the group of signals comprising the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power;

determining at least one mean value of the at least one determined energy-related value for the band-pass signal;

modifying the at least one energy-related value for the band-pass signal on the basis of the determined mean value for the band-pass signal; and computing the filter coefficients for the suppression filter on the basis of the at least one modified energy-related value for the band-pass signal.

31. A non-transitory computer readable medium including a program with a program code for performing, when the program is executed on a processor, the method of suppression filtering of a second audio signal to suppress an echo based on a first audio signal, said method comprising:

determining at least one energy-related value for a band-pass signal of at least two temporally successive data blocks of at least one signal of a group of signals, the group of signals comprising the first audio signal, the second audio signal and a signal derived from the first audio signal or the second audio signal, wherein the energy-related value is proportional to a power of a value of the band-pass signal with a positive, integer exponent, or wherein the energy-related value is proportional to a power of a magnitude of the value of the band-pass signal with a positive real number as exponent of the power;

determining at least one mean value of the at least one determined energy-related value for the band-pass signal;

modifying the at least one energy-related value for the band-pass signal on the basis of the determined mean value for the band-pass signal; and filtering the second audio signal on the basis of filter coefficients, wherein the filter coefficients are based on the at least one modified energy-related value for the band-pass signal.

32. A non-transitory computer readable medium including a program with a program code for performing, when the program is executed on a processor, the method of computing a delay value for a delayer for delaying a first signal with respect to a second signal, said method comprising:

determining at least one energy-related value for a band-pass signal of the first signal and of the second signal of at least two temporally successive data blocks, wherein the energy-related value is proportional to a power of a value of the band-pass signal with a positive, integer exponent, or wherein the energy-related value is proportional to a power of a magnitude of the value of the band-pass signal with a positive real number as exponent of the power;

determining at least one mean value of the at least one determined energy-related value for the band-pass signal of the first signal and of the second signal;

modifying the at least one energy-related value for the band-pass signal of the first signal and of the second signal on the basis of the determined mean value for the band-pass signal of the first and second signals; and computing the delay value on the basis of the modified energy-related values of the first and second signals, so that the delay value is based on a maximum value of a coherence function, wherein the coherence function is based on the modified energy-related values of the first and second signals.

* * * * *

UNITED STATES PATENT AND TRADEMARK OFFICE
CERTIFICATE OF CORRECTION

PATENT NO. : 8,731,207 B2  
APPLICATION NO. : 12/864240  
DATED : May 20, 2014  
INVENTOR(S) : Fabian Kuech et al.

It is certified that error appears in the above-identified patent and that said Letters Patent is hereby corrected as shown below:

Title Page, Item (73) assignee name should read as follows:

"Fraunhofer-Gesellschaft zur Foerderung der angewandten Forschung e. V."

In the Claims

And please correct Claim 19, Column 37, line 66 as follows:

"...comprises a modifier programmed..."

Signed and Sealed this  
Eleventh Day of November, 2014

Michelle K. Lee  
*Deputy Director of the United States Patent and Trademark Office*